United States Patent
Nakane et al.

(10) Patent No.: US 6,889,134 B2
(45) Date of Patent: May 3, 2005

(54) COMMUNICATION-TYPE NAVIGATION APPARATUS AND SERVER DEVICE

(75) Inventors: Yuusuke Nakane, Tokyo-to (JP); Atsuhiko Fukushima, Kawagoe (JP); Toyohiro Takenaka, Kawagoe (JP); Takashi Takenaga, Tokyo-to (JP); Yuji Koga, Kawagoe (JP)

(73) Assignees: Pioneer Corporation, Tokyo-to (JP); Increment P Corporation, Tokyo-to (JP)

( * ) Notice: Subject to any disclaimer, the term of this patent is extended or adjusted under 35 U.S.C. 154(b) by 0 days.

(21) Appl. No.: 10/231,363

(22) Filed: Aug. 30, 2002

(65) Prior Publication Data

US 2003/0045997 A1 Mar. 6, 2003

(30) Foreign Application Priority Data

Aug. 31, 2001 (JP) ........................................ 2001-263165
Aug. 31, 2001 (JP) ........................................ 2001-263173
Sep. 3, 2001 (JP) ........................................ 2001-266002
Sep. 3, 2001 (JP) ........................................ 2001-266021

(51) Int. Cl.[7] ............................ G06K 9/36; G01C 21/32
(52) U.S. Cl. ................. 701/202; 340/995.19; 340/995; 345/619; 382/232; 455/456; 342/357.09
(58) Field of Search ................................ 701/202, 209, 701/208, 210, 205, 212; 340/995.19, 995.12, 995.14, 990, 988, 995, 998; 345/619, 620, 425; 382/232; 455/3.02, 456, 457; 705/52; 342/357.09

(56) References Cited

U.S. PATENT DOCUMENTS

| | | | | |
|---|---|---|---|---|
| 5,699,255 A | * | 12/1997 | Ellis et al. | 701/212 |
| 5,845,228 A | * | 12/1998 | Uekawa et al. | 701/209 |
| 5,917,436 A | * | 6/1999 | Endo et al. | 340/995.14 |
| 5,919,245 A | * | 7/1999 | Nomura | 701/207 |
| 6,122,594 A | * | 9/2000 | Tamaki et al. | 701/208 |
| 6,178,377 B1 | * | 1/2001 | Ishihara et al. | 701/200 |
| 6,233,521 B1 | * | 5/2001 | Nomura | 701/208 |
| 6,292,743 B1 | * | 9/2001 | Pu et al. | 701/202 |
| 6,324,467 B1 | * | 11/2001 | Machii et al. | 701/200 |
| 6,356,839 B1 | * | 3/2002 | Monde et al. | 701/210 |
| 6,603,407 B2 | * | 8/2003 | Endo et al. | 340/995.14 |
| 2001/0051851 A1 | * | 12/2001 | Suzuki et al. | 701/208 |
| 2002/0040271 A1 | * | 4/2002 | Park et al. | 701/209 |

FOREIGN PATENT DOCUMENTS

| | | | |
|---|---|---|---|
| DE | 19755610 A1 | * 6/1999 | ......... G08G/1/0962 |
| EP | 0 786 646 A2 | 7/1997 | |
| EP | 1 085 345 A1 | 3/2001 | |
| JP | 7-262495 | 10/1995 | |
| JP | 10-096644 | 4/1998 | |
| WO | WO 99/09374 | 2/1999 | |

* cited by examiner

Primary Examiner—Thomas G. Black
Assistant Examiner—Tuan C To
(74) Attorney, Agent, or Firm—Morgan, Lewis & Bockius LLP

(57) ABSTRACT

A communication type navigation apparatus can communicate with a server device via a communication path. The navigation apparatus requests route search, and the server device executes route search to produce route information of a searched route. Then, the meshes necessary to travel along the searched route are determined, and the navigation apparatus obtains necessary mesh data from the server device. The navigation apparatus may request newer mesh data to the server device based on the updating information of the mesh data. By appropriately determining the mesh data to be and not to be downloaded from the server device, the communication cost necessary for obtaining the mesh data can be saved.

65 Claims, 24 Drawing Sheets

Fig. 5

20: MAP DATA (MESH DATA)

(1) ROAD DATA (REPRESENTING ROADS)

(2) BACKGROUND DATA
(DATA OF BACKGROUND OTHER THAN ROADS)

(3) AUXILIARY DATA
• CHARACTER DATA
(CHARACTERS OF ADDRESS, ETC.)
• MAP MARK OF FACILITY (SCHOOL, HOSPITAL, ETC)
• LOGO-MARK (SHOP, GAS STATION, ETC)

Fig. 6

| MESH CODE | SCALE INFORMATION | UPDATE INFORMATION (UPDATING DATE) | DATA FILE |
|---|---|---|---|
| M11 | 1/50000 | 2000/05/06 | Mesh000011 |
| M12 | 1/50000 | 2001/1/12 | Mesh000012 |
| M13 | 1/50000 | 2000/10/11 | Mesh000013 |
| . | . | . | . |
| . | . | . | . |

Fig. 14

| BLOCK CODE | SCALE INFORMATION | UPDATING INFORMATION (UPDATING DATE) | MESH CODES OF MESHES FORMING BLOCK |
|---|---|---|---|
| B11 | 1/50000 | 2000/07/15 | M11,M12,M21,M22 |
| B12 | 1/50000 | 2001/02/10 | M13,M14,M23,M24 |
| B13 | 1/50000 | 2000/11/11 | M15,M16,M25,M26 |
| . | . | . | . |
| . | . | . | . |

Fig. 20

| MESH CODE | SCALE INFORMATION | UPDATING INFORMATION (UPDATING DATE) | DATA FILE |
|---|---|---|---|
| M11−1 | 1/12500 | 2000/05/06 | Mesh000011-1 |
| M11−2 | 1/12500 | 2001/01/12 | Mesh000011-2 |
| M11−3 | 1/12500 | 2000/10/11 | Mesh000011-3 |
| ... | ... | ... | ... |
| M12−1 | 1/12500 | 2000/05/06 | Mesh000012-1 |
| M12−2 | 1/12500 | 2001/01/12 | Mesh000012-2 |
| ... | ... | ... | ... |
| M13−1 | 1/12500 | 2000/05/06 | Mesh000013-1 |
| ... | ... | ... | ... |

COMMUNICATION-TYPE NAVIGATION APPARATUS AND SERVER DEVICE

BACKGROUND OF THE INVENTION

1. Field of the Invention

This invention belongs to a technical field of a communication-type navigation apparatus, and more particularly to process of obtaining and updating map data, executed at the time of a route guide and a route search.

2. Description of Related Art

A known navigation apparatus utilizes map data stored in a map data storage medium such as a CD-ROM (Compact Disc-Read Only Memory) or a DVD-ROM (DVD-Read Only Memory). Namely, the navigation apparatus includes a drive unit for the map data storage medium such as a CD-ROM or a DVD-ROM, and reads out map data around the current position of the vehicle according to the movement of the vehicle to display the map data on a LCD (Liquid Crystal Display) or the like attached on the vehicle near a driving seat of the vehicle.

However, in case of using such a storage medium as a data supply source of map data, there is a problem that frequently updating the map data is difficult. The map data is updated in accordance with the expansion of road network. Also, the map data used by the navigation apparatus includes, in addition to road data, information such as neighboring facilities and/or shops (e.g., road-side shops, gas stations and so on). Recently, shops open and shut up relatively frequently. A user who always needs new information should frequently buy and change the map data storage medium, and this is burdensome for the user. In addition, a new edition of map data storage medium is put into the market every certain time period, e.g., every 6 months or every year, and hence the user cannot catch up with the on-going real change of the shops or stores even if he or she buys a new edition every time.

Moreover, recently functions of the navigation apparatus are being improved and sophisticated, and the map data includes more auxiliary data, other than the road data. Hence, the navigation apparatus needs to employ a microprocessor having high-speed processing capability to enable sophisticated route search and/or route guide. This increases the size and the cost of the navigation apparatus.

In order to overcome the above-mentioned problems, recently a communication-type navigation system has been proposed. In such a communication-type navigation system, a navigation apparatus installed on a vehicle and a map data providing center on a communication network communicate with each other by wireless communication, and map data is downloaded from the map data providing center to the navigation apparatus on the vehicle. The navigation apparatus stores the downloaded map data in an internal storage medium such as a hard disk, and performs map display and/or route guide by using the stored map data. Examples of such a communication-type navigation apparatus are disclosed in Japanese Patent Applications Laid-Open under No. 7-262495 and No. 10-96644.

In such a communication-type navigation system, by updating the map database on the map data providing center side, a user can always obtain and use newest map data by communication with the map data providing center.

A route search is known as a useful function of a navigation apparatus. The route search is a function that calculates and displays a travel route to a destination designated by the user, and the calculation of the travel route is basically executed based on the map data. In order to guide the user to drive along the travel route obtained by the route search, the navigation apparatus needs to have map data covering the travel route.

However, in a communication-type navigation apparatus, the map data is basically obtained by the communication with the map data providing center. Therefore, if all necessary map data covering the travel route to a far destination is downloaded from the map data providing center by communication, considerable communication cost is required. Therefore, it is desired that the user can obtain only necessary map data or road data dependently upon various situation.

In addition, the map data is periodically updated, and it is preferred to obtain and use as new map data as possible to effectively utilize the functions of the navigation apparatus such as the route search function. Hence, ideally it is preferred to obtain newest version for all map data covering the travel route determined by the route search. However, in consideration of communication cost, it is required to efficiently update only necessary map data.

SUMMARY OF THE INVENTION

It is an object of the present invention to provide a communication-type navigation apparatus and a server device that enable the user to efficiently obtain and update map data at the time of route search.

According to one aspect of the present invention, there is provided a server device which can communicate with a communication-type navigation apparatus via a communication path, including: a search unit which receives a route search request from the communication-type navigation apparatus and executes route search to produce route information of a searched route; a determination unit which determines meshes corresponding to road zone, other than a highway zone, of roads on the searched route: and a transmission unit which transmits mesh identification information and updating information of the determined meshes, and the route information, to the communication-type navigation apparatus. During the highway zone, detailed mesh data are not always necessary. This server device performs necessary map updating for only the mesh data within the zone other than the highway zone, and hence necessary map data may be updated with saving the communication cost.

The transmission unit may include a unit which transmits highway mode data corresponding to the highway zone to the communication type navigation apparatus. In this feature, the server device transmits the highway mode data for the highway zone included in the searched route, and hence the navigation apparatus can perform route guide by the highway mode. Therefore, it becomes unnecessary to obtain newest mesh data in the highway zone.

According to another aspect of the present invention, there is provided a communication type navigation apparatus which can communicate with a server device via a communication path, the server device includes a search unit which receives a route search request from the communication-type navigation apparatus and executes route search to produce route information of a searched route; a determination unit which determines meshes corresponding to road zone, other than a highway zone, of roads on the searched route: and a transmission unit which transmits mesh identification information and updating information of the determined meshes, and the route information, to the communication-type navigation apparatus, the communication-type navigation apparatus including: a map data storage unit which stores mesh data; a mesh request unit which compares the mesh identification information and the updating information transmitted from the server device with the mesh identification information and the updating information stored in the map data storage unit to determine the mesh data to be obtained from the server device and which requests the determined mesh data to the server device. Since the mesh data which the server device transmits in response to the route request does not include the highway zone, unnecessary mesh data is not requested to the server. Thus, the map data can be obtained and updated with saving the communication cost.

The communication-type navigation apparatus may further include: a unit which receives the mesh data, that the mesh request unit has requested, from the server device; and a guide unit which performs route guide by using the mesh data and the route information received from the server device. In this feature, the route guide is performed by using the mesh data and route information received from the server device. Since the mesh data transmitted to the navigation apparatus correspond to the zones other than the highway zone, the detailed route guide can be provided to the user with the newest map data for the zones other than the highway zone.

The communication-type navigation apparatus may further include a unit which receives highway mode data corresponding to the highway zone from the server device, and the route guide unit may perform the route guide by using the highway mode data within the highway zone and performs the route guide by using the mesh data and the route information within zones other than the highway zone. By this feature, route guide is performed within the highway zone on the searched route based on the highway mode data transmitted from the server device, and the detailed route guide is performed within the zones other than the highway zone based on the newest mesh data.

The map data storage unit may store map data for broad area display, and the route guide unit may perform the route guide in a highway mode by using the map data for broad area display and performs the route guide by using the mesh data and the route information within zones other than the highway zone. By this feature, route guide is performed within the highway zone on the searched route based on the map data for broad area display stored in the map data storage unit, and the detailed route guide is performed within the zones other than the highway zone based on the newest mesh data.

According still another aspect of the present invention, there is provided a server device which can communicate with a communication-type navigation apparatus via a communication path, including: a search unit which receives a route search request from the communication-type navigation apparatus and executes route search to produce route information of a searched route; a mesh determination unit which determines meshes corresponding to predetermined road zone on the searched route: and a transmission unit which transmits mesh identification information and updating information of the determined meshes, and the route information, to the communication-type navigation apparatus. The predetermined zone is determined to be a zone in which detailed mesh data is effectively used. Therefore, by performing necessary map updating for only the mesh data within the predetermined zone, the navigation apparatus can save the communication cost.

The mesh determination unit may determine meshes within a predetermined range from a destination included in the route search request. By this feature, since the navigation apparatus can obtain newest map data around the destination of the route search request, detailed and accurate route guide can be provided around the destination.

The mesh determination unit may determine meshes within a zone that a user designates by using the communication-type navigation apparatus. Since the navigation apparatus can obtain newest mesh data within the zone designated by the user, detailed and accurate route guide can be provided within the zone that the user designated.

The mesh determination unit may determine meshes including roads other than major roads on the searched route. During traveling on the major road on the searched route, detailed map data is unnecessary. Therefore, the navigation apparatus obtains newest map data, if necessary, for the roads other than the major roads to perform route guide.

According still another aspect of the present invention, there is provided a communication type navigation apparatus which can communicate with a server device via a communication path, the server device includes a search unit which receives a route search request from the communication-type navigation apparatus and executes route search to produce route information of a searched route; a mesh determination unit which determines meshes corresponding to predetermined road zone on the searched route: and a transmission unit which transmits mesh identification information and updating information of the determined meshes, and the route information, to the communication-type navigation apparatus, the communication-type navigation apparatus including: a map data storage unit which stores mesh data; a mesh request unit which compares the mesh identification information and the updating information transmitted from the server device with the mesh identification information and the updating information stored in the map data storage unit to determine the mesh data to be obtained from the server device and which requests the determined mesh data to the server device. The mesh data transmitted from the server device in response to the route search request includes only for the predetermined zone in which the mesh data is effectively used. Therefore, the navigation apparatus does not request unnecessary data to the server device, and the map data can be obtained and updated with saving the communication cost.

The communication-type navigation apparatus may further include: a unit which receives the mesh data, that the mesh request unit has requested, from the server device; and a guide unit which performs route guide by using the mesh data and the route information received from the server device. By this feature, the route guide is performed based on the mesh data and the route information received from the server device. At that time, since the mesh data are for the predetermined zone in which the mesh data is effectively used, the detailed route guide is provided with the newest map data within the predetermined zone.

The communication-type navigation apparatus may further include a unit which receives guide information corresponding to zones other than the predetermined zone from the server device, and wherein the route guide unit performs the route guide by presenting the guide information within the zones other than the predetermined zone and performs the route guide by using the mesh data and the route information within the predetermined zone. By this feature, within the zone other than the predetermined zone, the route guide is performed by presenting the guide information transmitted from the server device. Within the predetermined zone, the detailed route guide is performed by using the newest mesh data. The guide information is a simple data such as a driving information at the next route point (e.g., Turn left at the intersection, etc.) and does not include map data, the required communication cost may be reduced.

The map data storage unit may store the map data for broad area display, and the route guide unit may perform route guide by presenting the guide information by using the map data for broad area display within zones other than the predetermined zone and performs the route guide by using the mesh data and the route information within the predetermined area. By this feature, within the zone other than the predetermined zone, the route guide is performed by presenting the guide information based on the map data for broad area display which is stored in the map data storage unit. Within the predetermined zone, the detailed route guide is performed by using the newest mesh data. The guide information is a simple data such as a driving information at the next route point (e.g., Turn left at the intersection, etc.) and does not include map data, the required communication cost may be reduced.

The mesh request unit may separately requests the mesh data to be obtained to the server device when each mesh data becomes necessary for the route guide. By this, even if the travel route is changed, it is possible to avoid that the mesh data already obtained is not wasted.

The mesh request unit may request the mesh data corresponding to the meshes that area not stored in the map data storage unit, out of the meshes necessary to travel along the searched route. By this feature, mesh data of the meshes that are not stored in the map data storage unit and necessary to travel along the searched route is obtained from the server device.

The mesh request unit may request the mesh data corresponding to the meshes having the updating information older than the updating information transmitted from the server device, out of the meshes necessary to travel along the searched route. By this feature, if the mesh data which is necessary to travel along the searched route and is stored in the navigation apparatus is old, new mesh data is obtained from the server device.

According to still another aspect of the present invention, there is provided a server device which can communicate with a communication-type navigation apparatus via a communication path, including: a search unit which receives a route search request from the communication-type navigation apparatus and executes route search to produce route information of a searched route; a determination unit which determines meshes necessary to travel along the searched route; and a transmission unit which transmits mesh identification information and updating information of the determined meshes, and the route information, to the communication-type navigation apparatus. Therefore, since the updating information of the meshes necessary in association with the searched route are provided, the navigation apparatus can update the map data by using the updating information.

The server device may further include a unit which receives a mesh data request of some meshes, out of the meshes necessary to travel along the searched route, from the communication-type navigation apparatus, and which transmits newest mesh data for the requested meshes to the communication-type navigation apparatus. By this feature, newest mesh data is provided for the mesh data requested by the navigation apparatus based on the updating information.

According to still another aspect of the present invention, there is provided a server device which can communicate with a communication-type navigation apparatus via a communication path, including: a search unit which receives a route search request from the communication-type navigation apparatus and executes route search to produce route information of a searched route; a determination unit which determines blocks including meshes necessary to travel along the searched route; and a transmission unit which transmits block identification information and updating information of the determined meshes, and the route information, to the communication-type navigation apparatus. By this, since the updating information of the blocks necessary in association with the searched route are provided, the navigation apparatus can update the map data by using the updating information.

The server device may further include a unit which receives a mesh data request of meshes included in the blocks from the communication-type navigation apparatus, and which transmits newest mesh data for the requested meshes to the communication-type navigation apparatus. By this feature, newest mesh data is provided for the mesh data requested by the navigation apparatus based on the updating information.

According to still another aspect of the present invention, there is provided a communication type navigation apparatus which can communicate with a server device via a communication path, the server device including a search unit which receives a route search request from the communication-type navigation apparatus and executes route search to produce route information of a searched route; a determination unit which determines meshes necessary to travel along the searched route; and a transmission unit which transmits mesh identification information and updating information of the determined meshes, and the route information, to the communication-type navigation apparatus, the communication-type navigation apparatus including: a map data storage unit which stores a plurality of mesh data; a mesh request unit which compares the mesh identification information and the updating information of the meshes necessary to travel along the searched route with the mesh identification information and the updating information stored in the map data storage unit to determine the mesh data to be obtained from the server device, and which requests the determined mesh data to the server device.

The above communication-type navigation apparatus receives the mesh identification information and updating information of the meshes necessary to travel along the searched route, and determines the necessary mesh data by comparing those meshes with the meshed stored in the navigation apparatus. The determined necessary mesh data is requested to the server device. Thus, the necessary mesh data can be obtained in connection with the route search.

According to still another aspect of the present invention, there is provided a communication type navigation apparatus which can communicate with a server device via a communication path, the server device including a search unit which receives a route search request from the communication-type navigation apparatus and executes route search to produce route information of a searched route; a determination unit which determines blocks including meshes necessary to travel along the searched route; and a transmission unit which transmits block identification information and updating information of the determined meshes, and the route information, to the communication-type navigation apparatus, the communication-type navigation apparatus including: a map data storage unit which stores a plurality of mesh data; a mesh request unit which compares the mesh identification information and the updating information of the meshes included in the block whose block identification is received with the mesh identification information and the updating information stored in the map data storage unit to determine the mesh data to be obtained from the server device, and which requests the determined mesh data to the server device.

The mesh request unit may request the mesh data corresponding to the meshes that are not stored in the map data storage unit, out of the meshes necessary to travel along the searched route. Also, the mesh request unit may request the mesh data corresponding to the meshes that are not stored in the map data storage unit, out of the meshes included in the blocks. By this feature, the mesh data which is necessary to travel along the searched route and is not stored in the navigation apparatus yet is obtained from the server device.

The mesh request unit may request the mesh data having the updating information older than the updating information transmitted from the server device, out of the meshes necessary to travel along the searched route. Also, the mesh request unit may request the mesh data having the updating information older than the updating information transmitted from the server device, out of the meshes included in the blocks. By this feature, if the mesh data that is necessary to travel along the searched route and is stored in the navigation apparatus is old, new mesh data is obtained from the server device.

The mesh request unit may request all of the mesh data to be obtained from the server device all at once. Thus, the mesh data necessary to travel along the searched route can be obtained all at once.

The communication-type navigation apparatus may further include: a unit which receives the mesh data, that the mesh request unit has requested, from the server device; and a unit which performs route guide based on the route information. Thus, the route guide is provided to the user along the searched route.

The mesh request unit may separately request the mesh data to be obtained to the server device when each mesh data becomes necessary for the route guide. By this feature, the mesh data necessary to travel along the searched route is separately obtained from the server device when it becomes necessary. Therefore, if the travel route is changed, it is possible to avoid such a situation that the mesh data already obtained are wasted.

The map data storage unit may include: a pre-install data storage unit which stores pre-install data; and a cache memory unit which stores mesh data obtained during travel. By this feature, any one of the mesh data obtained as the pre-install data and mesh data obtained during the traveling are updated at the time of the route search, if necessary.

According to still another aspect of the present invention, there is provided a server device which can communicate with a communication-type navigation apparatus, including: a map database which stores a plurality of mesh data; a search unit which receives a route search request from the communication-type navigation apparatus, which executes route search to produce route information of a searched route and which transmits the route information to the communication-type navigation apparatus; and an updating data transmission unit which receives the mesh identification information and updating information of the mesh data, that is necessary to travel along the searched route and that is stored in the communication-type navigation apparatus, which obtains mesh data, having the updating information newer than that of the mesh data stored in the communication-type navigation apparatus, from the map database, and which transmits the obtained mesh data to the communication-type navigation apparatus. By this server device, the map data can be appropriately updated at the time of the route search.

According to still another aspect of the present invention, there is provided a server device which can communicate with a communication-type navigation apparatus, including: a map database which stores a plurality of mesh data; a search unit which receives a route search request from the communication-type navigation apparatus, which executes route search to produce route information of a searched route and which transmits the route information to the communication-type navigation apparatus; and an updating data transmission unit which receives the mesh identification information and updating information of the mesh data of blocks including meshes necessary to travel along the searched route, which obtains mesh data of the blocks, having the updating information newer than that of the blocks received, from the map database, and which transmits the obtained mesh data to the communication-type navigation apparatus. By this server device, the map data can be appropriately updated at the time of the route search.

According to still another aspect of the present invention, there is provided a communication-type navigation apparatus which can communicate with a server device via a communication path, the server device including a map database which stores a plurality of mesh data; a search unit which receives a route search request from the communication-type navigation apparatus, which executes route search to produce route information of a searched route and which transmits the route information to the communication-type navigation apparatus; and an updating data transmission unit which receives the mesh identification information and updating information of the mesh data, that is necessary to travel along the searched route and that is stored in the communication-type navigation apparatus, which obtains mesh data, having the updating information newer than that of the mesh data stored in the communication-type navigation apparatus, from the map database, and which transmits the obtained mesh data to the communication-type navigation apparatus, the navigation apparatus including: a map data storage unit which stores a plurality of mesh data; and an updating information transmission unit which receives the route information, which determines the mesh data necessary to travel along the searched route, and which transmits the mesh identification information and the updating information of the mesh data stored in the map data storage unit, out of the mesh data necessary to travel along the searched route, to the server device. By this server device, the map data can be appropriately updated at the time of the route search.

According to still another aspect of the present invention, there is provided a communication-type navigation apparatus which can communicate with a server device via a communication path, the server device including a map database which stores a plurality of mesh data; a search unit which receives a route search request from the communication-type navigation apparatus, which executes route search to produce route information of a searched route and which transmits the route information to the communication-type navigation apparatus; and an updating data transmission unit which receives the mesh identification information and updating information of the mesh data of blocks including meshes necessary to travel along the searched route, which obtains mesh data of the blocks, having the updating information newer than that of the blocks received, from the map database, and which transmits the obtained mesh data to the communication-type navigation apparatus, the navigation apparatus including: a map data storage unit which stores a plurality of mesh data; and an updating information transmission unit which receives the route information, which determines the blocks including the meshes necessary to travel along the searched route, and which transmits the block identification information and the updating information to the server device.

According to still another aspect of the present invention, there is provided a server device which can communicate with a communication-type navigation apparatus via a communication path, including: a search unit which receives a route search request from the communication-type navigation apparatus and executes route search to produce route information of a searched route; a mesh determination unit which determines meshes necessary to travel along the searched route; a unit which determines whether or not the processing burden of the server device is higher than a predetermined burden level at the time when the server device receives the route search request; and a transmission unit which transmits the route information to the communication-type navigation unit when the processing burden is higher than the predetermined processing burden level, and transmits the mesh identification information and the updating information as well as the route information to the communication-type navigation apparatus when the processing burden is not higher than the predetermined burden level. By this, the map data can be efficiently updated in accordance with the processing burden of the server device.

According to still another aspect of the present invention, there is provided a server device which can communicate with a communication-type navigation apparatus, including: a search unit which receives a route search request from the communication-type navigation apparatus and executes route search to produce route information of a searched route; a layer selection unit which selects layer of the mesh data necessary to travel along the searched route based on the route information; and a transmission unit which transmits layer data of the selected layer and the route information to the communication-type navigation apparatus. Since the mesh data forming the map data is an aggregation of the layer data of a plurality of layers, by selecting only necessary layers and transmitting the layer data, the user can efficiently obtain map data necessary for the route guide.

According to still another aspect of the present invention, there is provided a server device which can communicate with a communication-type navigation apparatus, including: a search unit which receives a route search request from the communication-type navigation apparatus and executes route search to produce route information of a searched route; a layer selection unit which selects layer of the mesh data necessary to travel along the searched route based on the route information; and a transmission unit which transmits identification information and updating information of layer data of the selected layer and the route information to the communication-type navigation apparatus. Since the mesh data forming the map data is an aggregation of the layer data of a plurality of layers, by selecting only necessary layers and transmitting the layer data, the user can efficiently obtain map data necessary for the route guide.

According to still another aspect of the present invention, there is provided a communication-type navigation apparatus which can communicate with a server device via a communication path, the server device including a transmission unit which receives route search request from the communication-type navigation apparatus, executes route search to produce route information of a searched route and transmits the route information to the navigation apparatus, the navigation apparatus including: a layer selection unit which selects layers of mesh data necessary to travel along the searched route based on the route information transmitted from the server device; and a request unit which requests the layer data of the selected layers to the server device. Since the mesh data forming the map data is an aggregation of the layer data of a plurality of layers, by selecting only necessary layers and transmitting the layer data, the user can efficiently obtain map data necessary for the route guide.

The layer selection unit may select the layer data of all layers for the meshes that include the searched route and selects the layer data of a portion of the layers for the meshes that do not include the searched route. By this feature, the map data around the travel route of the vehicle can be presented to the user in detail, and the map data around the travel route can be roughly presented such as only the major roads. Thus, communication cost may be saved.

The layer selection unit may select the layer data of all layers for the meshes within a predetermined range from a destination and selects the layer data of a portion of the layers for the meshes outside of the predetermined range. By this feature, detailed route guide can be presented by using the data of all layers around the destination, and minimum layer data is obtained for other areas. Thus, the communication cost may be saved.

The layer selection unit does not select layers including only highway or toll road if the route search request includes such a condition that highway or toll road is not used. By this feature, the communication cost can be saved by not obtaining layer data of unnecessary layer.

The layer selection unit may select only specific layers predetermined according to a purpose of route search if the route search request includes a designation of the purpose of the route search. By this feature, only the layer data of appropriate layer can be obtained according to the purpose of the route search. For example, logo-marks can be obtained to present various information for the purpose of a private driving, and only the road data and auxiliary data can be obtained for the purpose of the business transportation, thereby saving the communication cost.

If the route search request includes such a condition that specific layer is not used, the layer selection unit does not select the specific layer. By this feature, only necessary layer data is obtained according to the condition set in the route search request, and hence unnecessary communication cost may be saved.

If the searched route includes highway zone, the layer selection unit may select the layer including only road data of the highway for the meshes corresponding to the highway zone. By this feature, the highway mode is used in the highway zone so that only the layer data necessary for the highway mode is obtained. Thus, it is unnecessary to obtain layer data of normal road, and the communication cost may be effectively reduced.

If the route search request includes a maximum communication charge necessary for obtaining map data, the layer selection unit may select the layers within the maximum communication charge. By this feature, since the communication is executed within the range set by the user, it is possible to avoid that unexpected high communication cost is required.

The nature, utility, and further features of this invention will be more clearly apparent from the following detailed description with respect to preferred embodiment of the invention when read in conjunction with the accompanying drawings briefly described below.

BRIEF DESCRIPTION OF THE DRAWINGS

FIG. 5 shows an example of data structure of map data (mesh data);

FIG. 6 shows examples of mesh data and associated information stored in the map DB;

FIG. 14 is an example of block management information according to the second embodiment;

FIG. 20 shows examples of mesh data and associated information stored in a map DB;

DETAILED DESCRIPTION OF THE PREFERRED EMBODIMENTS

The preferred embodiments of the present invention will now be described below with reference to the attached drawings. It is noted that the following embodiments are directed to a case where the present invention is applied to a communication-type vehicle navigation apparatus (hereinafter sometimes simply referred to as "navigation apparatus").

[Navigation Apparatus]

Figure 1:
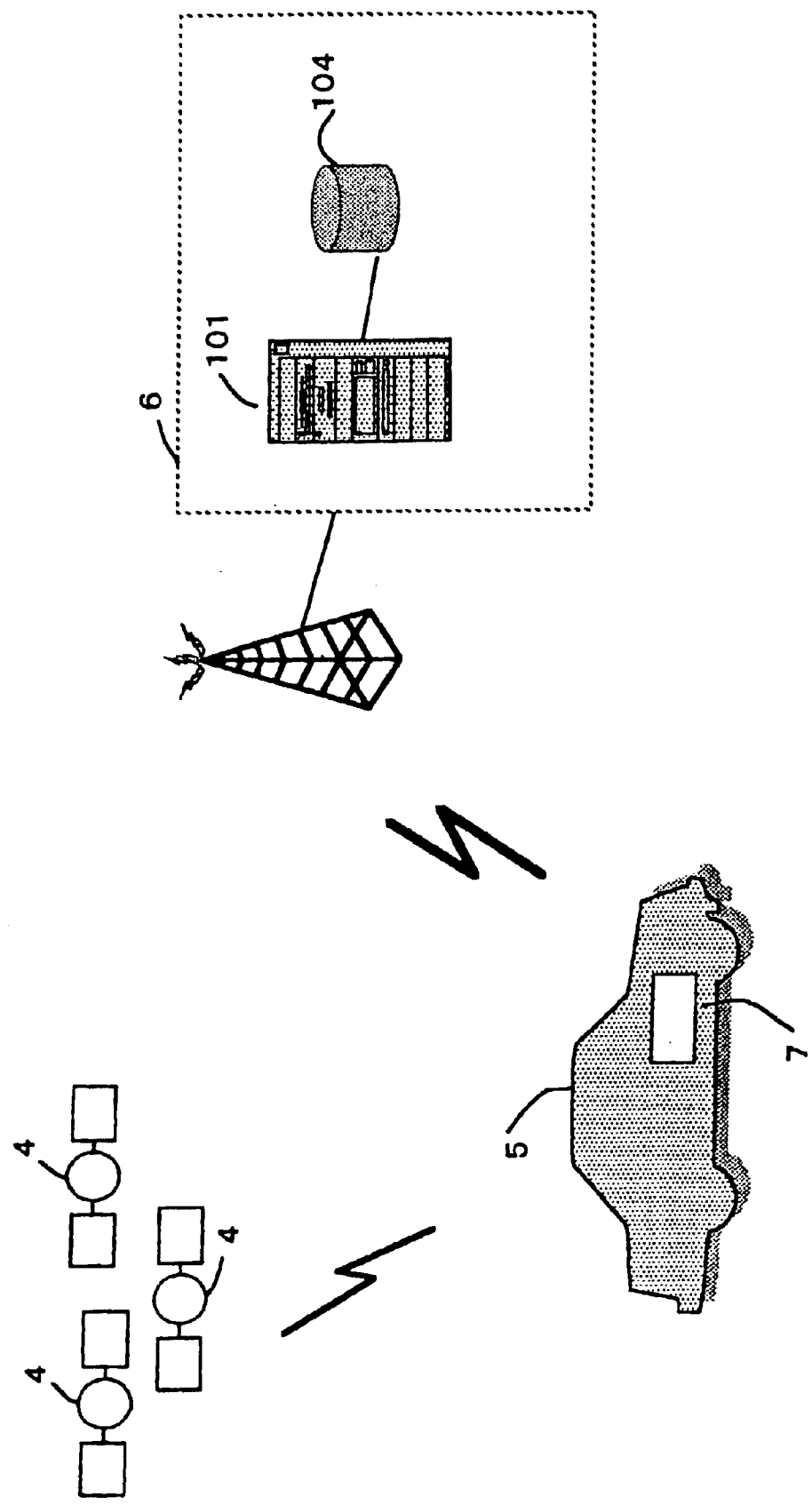
FIG. 1 is a diagram schematically showing a situation where a communication-type navigation apparatus is used.

FIG. 1 schematically illustrates a situation in which the navigation apparatus according to the present invention is used. In FIG. 1, the navigation apparatus 7 is installed on the vehicle 5. The navigation apparatus 7 receives radio waves from the plural satellites 4 to measure the position of the vehicle. Also, the navigation apparatus 7 connects to the service center 6 by the communication function to download the map data and stores it in the map data storage unit in the navigation apparatus 7. According to the movement of the vehicle, the navigation apparatus 7 obtains necessary map data from the service center 6 to execute function such as route search and/or route guide.

The service center 6 includes a server 101 and a map database (hereinafter simply referred to as "DB"). The map DB 104 stores map data, and further road data to be used for route search. The server 101 receives a request from the navigation apparatus 7, obtains necessary map data from the map DB 104 and sends the obtained map data to the navigation apparatus 7.

Figure 2:
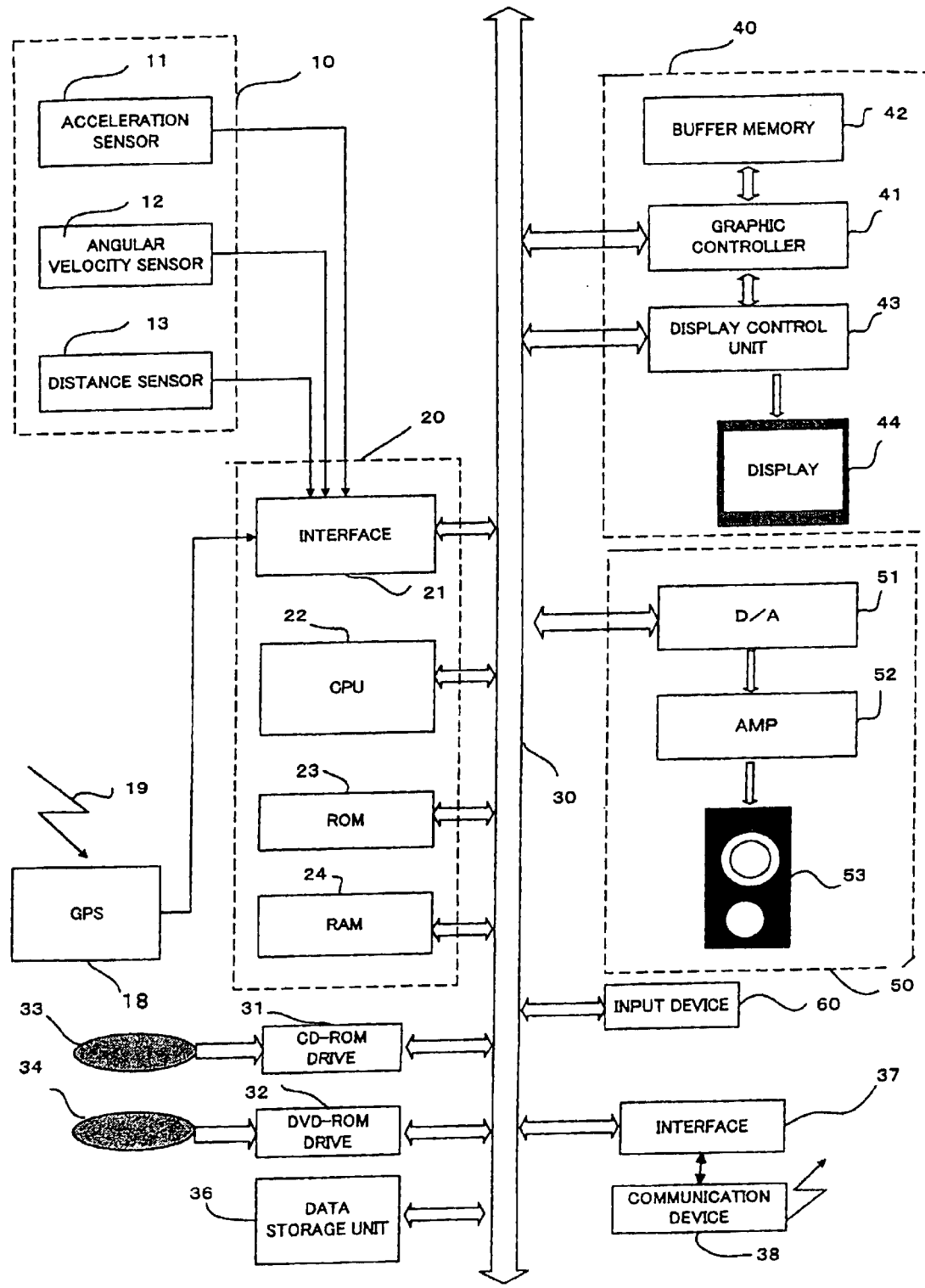
FIG. 2 is a block diagram showing a configuration of the communication-type navigation apparatus shown in FIG. 1.

FIG. 2 is a block diagram showing the navigation apparatus 7. As shown in FIG. 2, the navigation apparatus 7 includes a stand-alone navigation device 10, a GPS receiver 18, a system controller 20, a CD-ROM drive 31, a DVD-ROM drive 32, a data storage unit 36, a communication interface 37, a communication device 38, a display unit 40, a sound output unit 50 and an input device 60.

The stand-alone navigation device 10 includes an acceleration sensor 11, an angular velocity sensor 12 and a distance censer 13. The acceleration sensor 11 is formed of, for example, a piezoelectric device, and detects an acceleration of a vehicle and outputs acceleration data. The angular velocity sensor 12 is formed of, for example, a vibration gyroscope, and detects an angular velocity of a vehicle at the time of direction change of the vehicle, and outputs angular velocity data and relative bearing data.

The distance sensor 13 is formed of a vehicle velocity sensor which detects rotation of an axle of a vehicle mechanically, magnetically or optically, and generates a vehicle velocity pulse which is a pulse signal, for every rotation for a predetermined angle of the axle.

The GPS receiver 18 receives an electric wave 19 carrying downstream line data including data for positioning, from a plurality of GPS satellites to be used for detecting an absolute position of the vehicle according to latitude and longitude information and the like.

The system controller 20 includes an interface 21, a CPU (Central Processing Unit) 22, a ROM (Read Only Memory) 23 and a RAM (Random Access Memory) 24, and is configured to control the entire navigation apparatus 7.

The interface 21 carries out interface operation with the acceleration sensor 11, the angular velocity sensor 12 and the distance censer 13 so as to input, to the system controller 20, the acceleration data, the relative bearing data, the angular velocity data, the GPS positioning data, the absolute bearing data and the like in addition to a vehicle velocity pulse. The CPU 22 controls the entire system controller 20. The ROM 23 has a non-volatile memory or the like (not shown) in which control programs or the like for controlling the system controller 20 is stored. The RAM 24 stores various data such as route data entered in advance by a user via the input device 60, in a readable manner, and provides a working area for the CPU 22.

The system controller 20, the CD-ROM drive 31, the DVD-ROM drive 32, the data storage unit 36, the communication interface 37, the display unit 40, the sound output unit 50 and the input device 60 are connected with each other via a bus line 30.

The CD-ROM drive 31 and the DVD-ROM drive 32 read out, under the control of the system controller 20, contents data such as audio data and/or video data from a CD 33 and a DVD 34, respectively, and output the same. It should be appreciated that the CD-ROM drive 31 and the DVD-ROM drive 32 may be provided solely, or a CD/DVD compatible drive may be provided.

Also, in the present invention, the map data used in the navigation apparatus 7 is basically pre-installed as described later or installed by downloading from the service center 6 via the data communication. However, the navigation apparatus 7 may be configured to use the map data stored in the CD-ROM 33 or DVD-ROM 34. Especially, if the user uses special planning map disc (e.g., a golf course map, a ski area map, a tour plan guide of sightseeing spots, etc.) other than normal road map data, the CD-ROM drive 31 or the DVD-ROM drive 32 may be advantageously used.

The data storage unit 36 mainly stores map data. The map data is basically obtained by the pre-install process described later and is also obtained by downloading from the service center 6 as necessary during the traveling of the vehicle. The map data thus obtained is stored in the data storage unit 36. It is noted that the data storage unit 36 may store audio and/or video data obtained from the CD-ROM drive 31 or the DVD-ROM drive 32, as necessary, as well as map data of the above-mentioned special plan disc.

The communication device 38 is implemented by, for example, a cellular phone, and is configured to be able to download, via the communication interface 37 forming a modem or the like, map data from the service center 6.

The display unit 40 displays various kinds of display data under the control of the system controller 20. The display unit 40 includes a graphic controller 41 for controlling the entire display unit 40 based on control data sent from the CPU 22 via the bus line 30; a buffer memory 42 formed of a memory such as VRAM (Video RAM) and for temporarily storing image information which is ready for display; a display control unit 43 for controlling a display 44 such as liquid crystal or CRT (Cathode Ray Tube) display based on image data output from the graphic controller 41; and the display 44. The display 44 is implemented by a liquid crystal display or the like having a diagonal length of about 5 to 10 inches, for example, and is mounted in the vicinity of a front panel in a vehicle.

The sound output unit 50 includes a D/A converter 51 for performing D/A (Digital to Analogue) conversion of digital sound data sent from the CD-ROM drive 31 or the DVD-ROM 32, or from the RAM 24 or the like via the bus line 30 under the control of the system controller 20; an amplifier (AMP) 52 for amplifying an analog sound signal output from the D/A converter 51; and a speaker 53 for converting the amplified analog sound signal to sound and outputting the sound to the interior of the vehicle.

The input device 60 is configured by a key, a switch, a button, a remote-controller, a voice input device or the like. The input device 60 is disposed around the front panel of the main body of the navigation apparatus 7 mounted in the vehicle or around the display 44.

[Pre-Install System]

Next, a pre-install system for pre-installing map data will be described. In the communication-type navigation apparatus 7 according to the present invention, map data is basically obtained from the service center 6 by way of data communication. However, at the time of initial setting or the like, relatively large amount of map data should be prepared and installed into the navigation apparatus. If all of the map data is downloaded by data communication at the time of initial setting, the user's burden of the communication cost increases a lot. In this view, according to the present invention, a certain amount of basic map data is installed into the map data storage medium in the navigation apparatus at the time of initial setting or the like (this process will be hereinafter referred to as "pre-install"), and thereafter the user connects to the map data providing center to download necessary data according to need. Thus, it is unnecessary to download large amount of map data by data communication when the navigation apparatus is first used, and necessary map data can be efficiently obtained.

Figure 3:
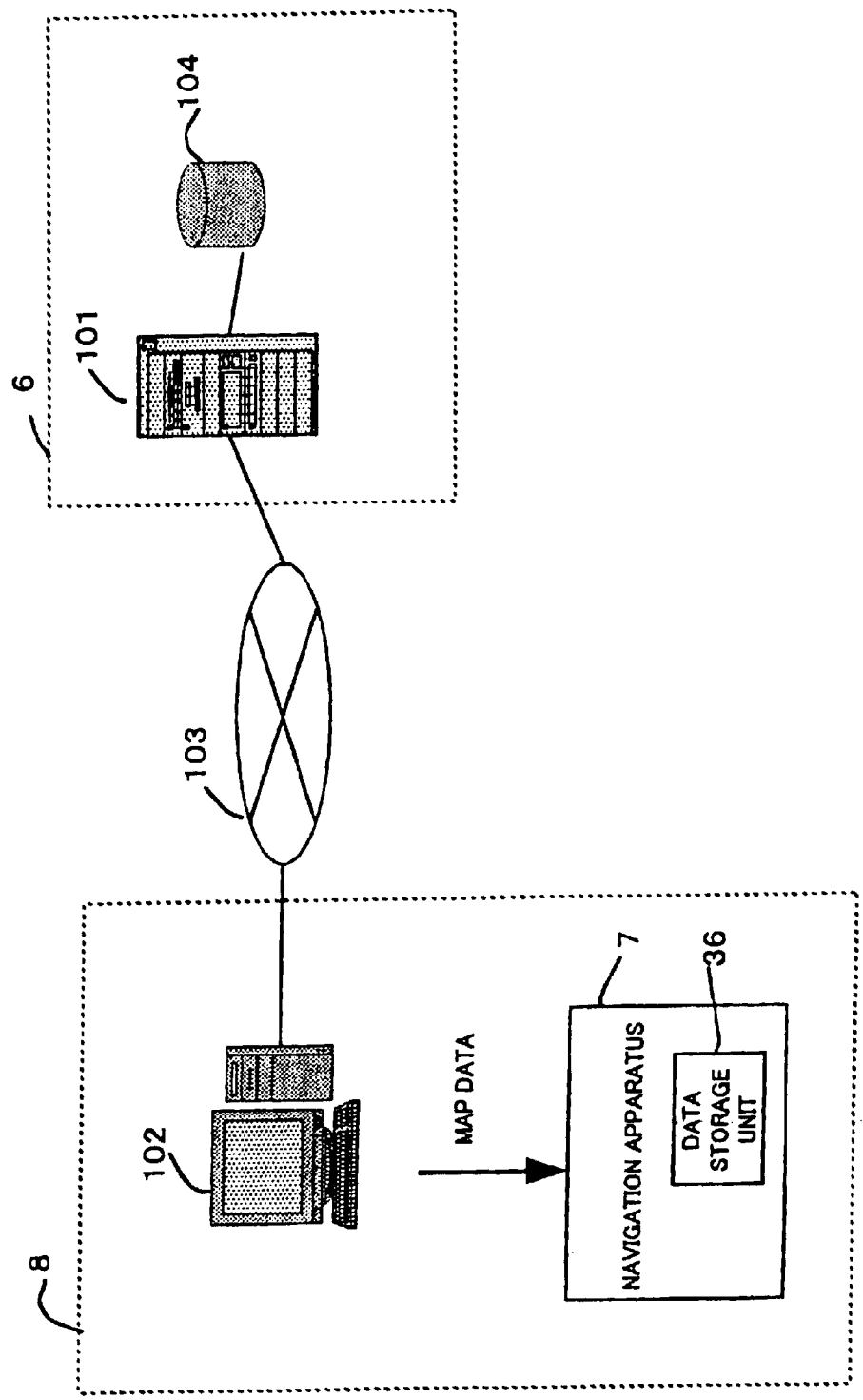
FIG. 3 is a diagram showing a configuration of a system for pre-installing map data to the communication-type navigation apparatus.

FIG. 3 schematically shows a system for pre-install processing. As shown in FIG. 3, a shop 8 and the service center 6 are connected via a communication network 103. The shop 8 may be, for example, a car dealer or a car shop which deals in navigation apparatuses.

The server 101 obtains necessary map data from the map database 104 upon request from the shop 8, and transmits the map data to the shop 8 via the communication network 103.

In the shop 8, a pre-install terminal 102 is provided. The pre-install terminal 102 sends a request for the map data to be pre-installed to the user's navigation apparatus to the service center 6, receives the map data, and temporarily stores it in an internal memory or the like. Then, the pre-install terminal 102 stores the map data into the data storage unit 36 in the user's navigation apparatus 7.

There are some different methods to transfer the map data from the pre-install terminal 102 to the data storage unit 36 of the navigation apparatus 7. One method is that the pre-install terminal 102 temporarily stores the map data onto a storage medium such as a DVD-RAM, a semi-conductor memory, a card-type storage medium or the like, and the storage medium is inserted into the drive unit of the navigation apparatus 7 so that the map data is read out from the storage medium and stored into the data storage unit 36 of the navigation apparatus 7.

As another method, if the data storage unit 36 is constituted by a removable medium such as a semi-conductor memory or a hard disk, the map data is transferred from the pre-install terminal 102 to the removable medium, which is then given to the user. The user simply attaches the removable medium to his or her navigation apparatus 7, thereby to complete the pre-install of the map data. It is noted that, in this method, the medium on which the map data for pre-install is stored may be delivered to the user by mail or other delivery service, and the user does not have to visit the shop 8 for pre-install process.

Other than the above-mentioned methods, the map data may be transferred to the navigation apparatus 7 by taking advantage of the communication function of the navigation apparatus 7, for example, by wireless communication with pre-install terminal 102 via infrared communication or the like, or by wired data communication with the data transfer line being connected between the pre-install terminal 102 and the navigation apparatus 7.

[1st Embodiment]

Next, a first embodiment of the present invention will be described.

(1-1) Map Data

The data structure of the map data according to the first embodiment will be described. In the first embodiment, in addition to mesh data normally used by the navigation apparatus 7 in a map display mode and/or guide mode, highway mode data and guide view mode data serving as guidance information are used as necessary. Each data will be described below.

(1-1-1) Mesh Data

The map data is produced by a unit obtained by dividing a certain geographical region into a plurality of blocks each having a predetermined area. This unit will be hereinafter referred to as "mesh", and a unit of the map data corresponding to one mesh will be referred to as "mesh data". Namely, the map data is an aggregation of mesh data.

Figure 4:
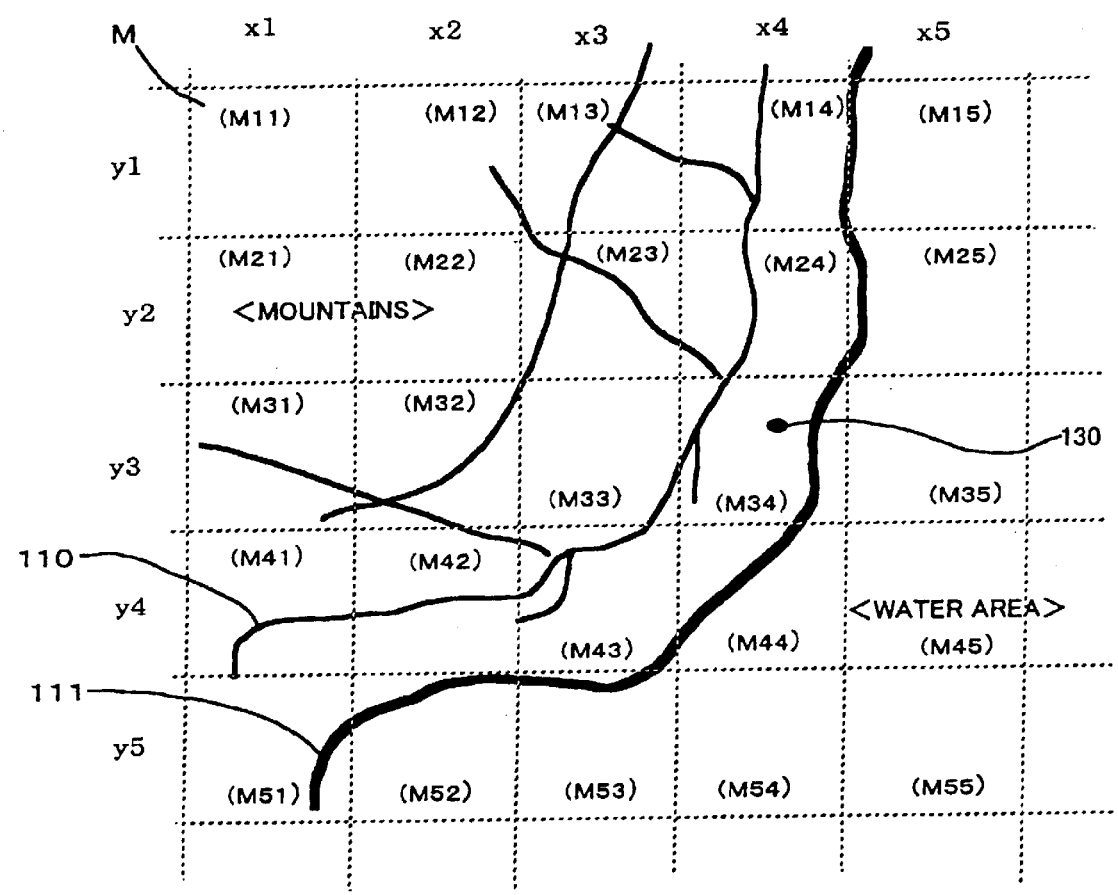
FIG. 4 is a diagram schematically showing a manner of dividing a certain geographical area into a plurality of meshes.

FIG. 4 schematically shows an example, wherein map of a certain region along a shore is divided into a plurality of meshes. In FIG. 4, the line 111 indicates the shoreline, the right side of which is water area (sea) and the left side of which is land. The left and upper area in FIG. 4 is a mountain area, and the lines 110 indicate roads.

As the map data, this region is divided into a plurality of meshes M defined in the form of lattice. In FIG. 4, the identification numbers (M11 to M55) are indicated in the meshes M. The mesh data is prepared for each mesh shown in FIG. 4. The x-coordinate and the y-coordinate correspond to the longitude and the latitude, respectively.

The map shown in FIG. 4 has a certain scale, and the mesh data is produced for plural scales. The map of Japan is produced for plural scales, and the map of each scale is divided into the plural meshes to produce the mesh data.

FIG. 5 shows an example of contents of the mesh data. The mesh data roughly includes road data, background data and auxiliary data. The road data is a vector data representing the roads on the map. The background data represents the area, other than the roads, in the region shown as the map data. The navigation apparatus 7 displays map of roads together with the situation around the road. For instance, a picture of a pond is displayed if there is a pond near a road, and the geographical sections are shown on the map in an urban area. These are included in the background data.

The auxiliary data corresponds to the characters, symbols, marks and the like shown within the map, and includes character data, geographical marks and logo-marks. The navigation apparatus 7 displays map with geographical names, addresses, intersection names, station names and the like in the form of characters, and the character data represents those characters. The map may sometimes include map marks such as schools, hospitals, post offices and so on, and these are included in the data representing map marks of facilities. Further, the logo-marks such as marks representing shops, gas stations and so on are included in the auxiliary data.

As described above, the mesh data basically includes the road data, the background data and the auxiliary data. However, there are regions for which those data do not exist. For instance, since the mesh M55 shown in FIG. 4 completely corresponds to the sea, no road, facility and shop exists. Therefore, the mesh data of mesh M55 includes only the background data, and does not include road data and auxiliary data. As the image of displayed map, the mesh M55 is shown as a simple blue area representing the sea, and the background data showing such blue sea area is included in the mesh data M55.

As appreciated, the data amount of each mesh data is different from each other. For example, the mesh data of the meshes M43 and M34 have large data amount because they include many roads intersected and the shoreline. On the contrary, the mesh data of the mesh M55 completely corresponding to the sea or the mesh M11 completely corresponding to the mountain area (with no road) has small data amount.

As described above, since the map data is produced as the plural mesh data prepared for plural different mesh data, the pre-install process is also executed by the unit of the mesh data. Namely, the pre-install is executed by storing the plural mesh data into the data storage unit 36 of the navigation apparatus 7.

FIG. 6 schematically shows contents of the map data stored in the map DB 104 of the service center 6. As mentioned, the map data is an aggregation of mesh data prepared for predetermined scales, and each mesh data has mesh code (M11, M12, . . . ) serving as identification number of the mesh as shown in FIG. 4. One mesh data includes data file which is main portion of the map data, and scale information and updating information serving as attribute information of each mesh data.

The mesh data is prepared for plural scales, and the scale information represents the scale of the mesh. The updating information is used to judge whether the mesh data is old or new, and represents the updating date in this example. It is noted that the updating information may be other type of information such as version information of the map data. As described later, by comparing the updating information of the mesh data, the mesh data is updated.

(1-1-2) Highway Mode Data

Figure 12A:
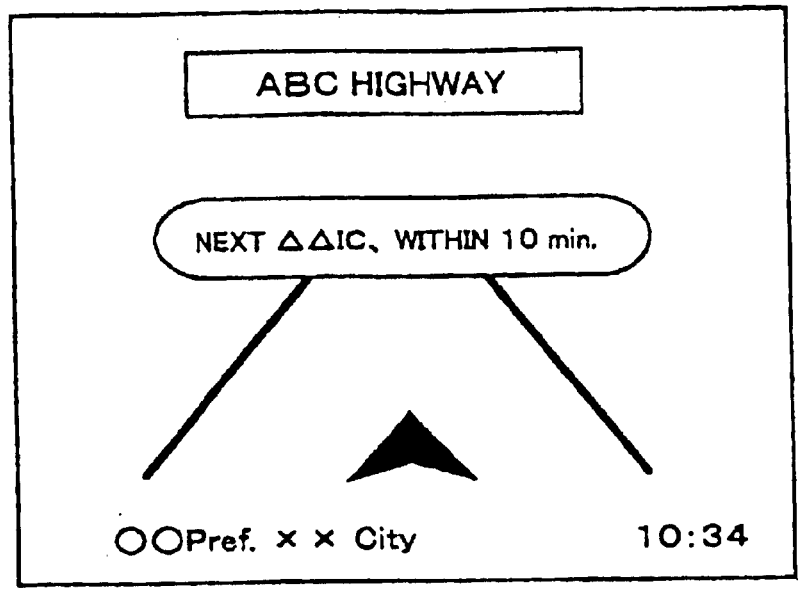
FIGS. 12A and 12B show display examples of highway mode and guide view mode.

Highway mode is a display mode which can be used when the vehicle with the navigation apparatus 7 is running on a highway or an expressway or a toll road, and FIG. 12A shows a display example. In the highway mode, map data is not displayed, and only information of an interchange, service areas, parking areas on the highway the vehicle is running are simply displayed. Specifically, a name and a distance from the current position of the next service area or parking area, and a name and a distance from the current position of next interchange.

Therefore, the highway mode data includes position information of those interchanges, service areas and so on, however, does not include map data (i.e., mesh data). In a simplest example, the highway data only needs to include latitude/longitude data indicating geographical position of the highway as well as facility information of the interchanges and service areas. Namely, the highway is regarded as an aggregation of plural geographical positions, and the geographical position on the highway is specified by the aggregation of the latitude/longitude of the respective points. In addition, the highway mode data includes position information of facilities such as interchanges and service areas, guide information of those facilities (e.g., interchange name, service area name, detailed information of the facility such as a restaurant and a gas station, a distance to the next facility, etc.). These data are much smaller in capacity than the above-mentioned mesh data.

The current position of the traveling vehicle can be obtained as geographical latitude and longitude data by the GPS 18 and/or stand-alone navigation device 10. If the current position of the vehicle is changing along the latitude and longitude data of the highway within an allowable error range, it is judged that the vehicle is running on the highway. When the current position of the vehicle approaches the latitude and longitude data of the interchanges and service areas, the guide information of the facility is displayed.

(1-1-3) Guide View Mode data

Figure 12B:
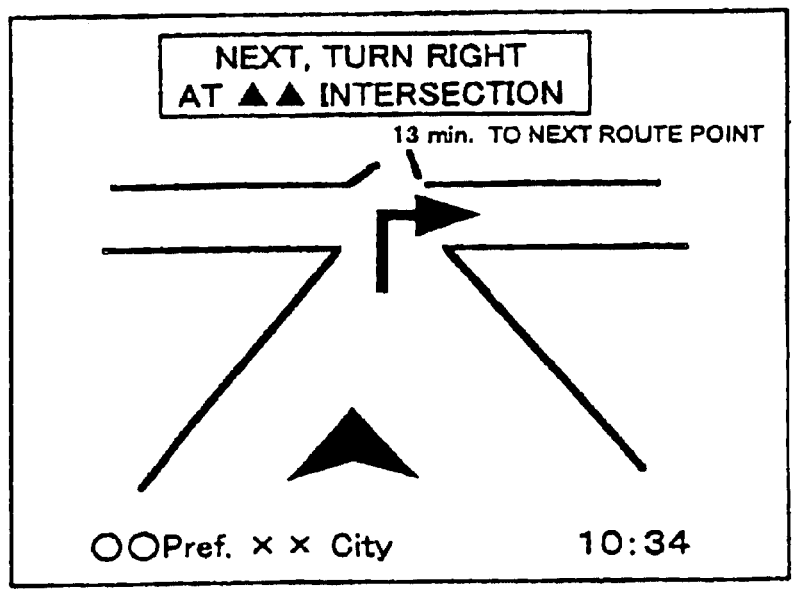

Guide view mode is a display mode in which map data is not displayed and only guide information of a route point such as a next intersection is displayed when the vehicle is traveling on a normal road along the route determined by the route search or else. Thus, the guide view mode is similar to the highway mode. A display example of the guide view mode is shown in FIG. 12B.

The guide view data also includes information specifying roads or intersections on the route to the destination (e.g., latitude and longitude data), as well as driving information at the route point (e.g., left-turn, right-turn, etc.), but does not include map data (mesh data) itself. Therefore, like the highway mode data, the data amount of the guide view data is much smaller than the mesh data.

When the vehicle is running, the driving information (e.g., turn right at the next intersection) is displayed. When the vehicle passes by the intersection, the driving information of next route point is displayed. The navigation apparatus 7 compares the current position information with the guide view mode data to provide the guide view.

(1-2) Configuration of Data Storage Unit

Figure 7:
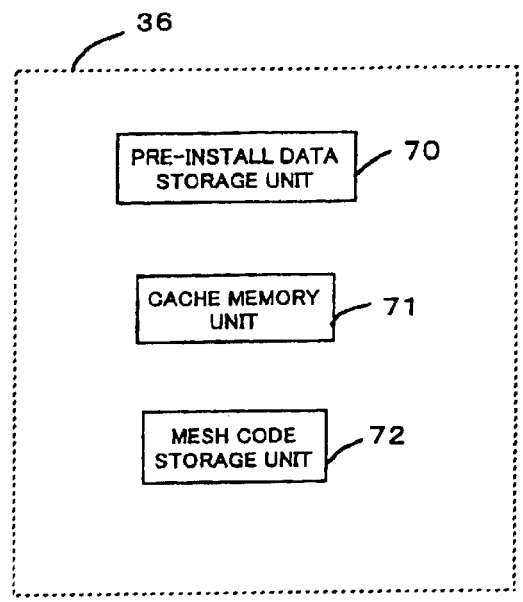
FIG. 7 schematically shows configuration of data storage unit.

FIG. 7 schematically shows a configuration of the data storage unit 36 in the navigation apparatus 7. The data storage unit 36 includes a pre-install data storage unit 70, a cache memory unit 71 and a mesh code storage unit 72, as the components relating to storage of the map data.

The pre-install data storage unit 70 stores the pre-installed map data. It is noted that, in the pre-install data storage unit 70, map data for broad area display, e.g. covering entire Japan, may be stored as default data. The map data for broad area display is very rough map data compared with the mesh data normally used in route guide, however, it may include major information necessary for the highway mode and/or guide view mode. The cache memory unit 71 stores map data that the navigation apparatus 7 downloaded from the service center 6, as necessary, after the pre-install process is finished. Since the storage capacity of the data storage unit 36 is limited, when the cache memory unit 71 becomes full of the map data obtained from the service center 6, the mesh data that is old or infrequently used is erased in order, to create the storage space for new data.

The mesh code storage unit 72 temporality stores necessary mesh codes in association with the downloading and updating of the mesh data.

The highway mode data and the guide view mode data are obtained from the server 101 in the service center 6 as necessary, and are stored in the cache memory unit 71. It is noted that the data storage unit 36 may store other data than map data, e.g., music data, as described above. However, this is not directly relevant to the present invention, and hence no detailed description will be given.

(1-3) Map Data Updating Process

Next, the map data updating process according to the first embodiment will be described. In the following map data updating process, when a user using the navigation apparatus 7 instructs route search, the navigation apparatus 7 obtains newest map data (mesh data) associated with the travel route determined by the route search. The route search process is basically executed by the server 101 in the service center 6. Since the route search process itself is known, the detailed described thereof will be omitted.

In the following description, it is premised that the pre-install data storage unit 70 of the navigation apparatus 7, that the user is using, already stores a certain range of map data, and further map data of certain area are stored in the cache memory unit 71 during the use of the navigation apparatus 7 after the pre-install process is finished.

(1-3-1) 1ST EXAMPLE

Figure 8:
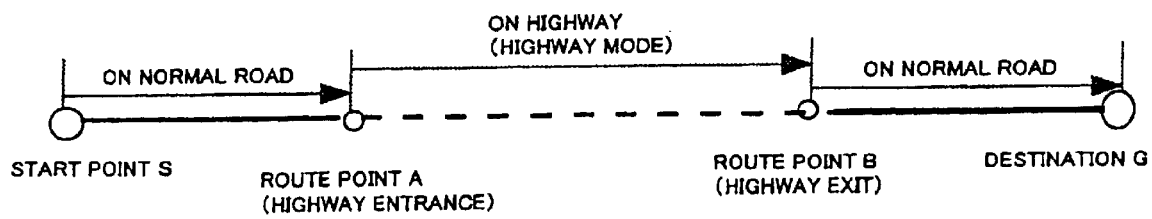
FIG. 8 shows concept of map data updating process according to a first example of a first embodiment of the present invention.

A first example of map data updating process will be described. In the first example, in executing the route search, if the route determined by the route search (hereinafter referred to as "searched route") includes highway, the highway mode is used during the vehicle running on the highway, and downloading the newest map data is omitted. This method is schematically shown in FIG. 8. It is supposed that the user instructed the route search from the start point S to the destination G and the searched route uses the highway from the route point A to the route point B. Generally, if highway is used, the distance to drive on the highway is relatively long and further the map data of the normal road is hardly used. Therefore, during the zone from the route point A to B, on which the vehicle runs on the highway, the display mode is switched to the highway mode and the route guide is provided to the user in the highway mode. Thus, the navigation apparatus 7 does not obtain newest mesh data even if the navigation apparatus 7 has no mesh data or has only old mesh data for the zone from the route point A to B. Namely, in the example shown in FIG. 8, the navigation apparatus 7 obtains newest mesh data, if exist, for the zone from the start point S to the route point A and the zone from the route point B to the destination G. In this way, downloading less useful mesh data may be avoided and the communication cost may be saved.

During the zone from the route A to B in which the highway mode is used, the route guide maybe performed by obtaining highway mode data from the server 101 in the service center 6, as necessary. Even in that case, since the highway mode data is much smaller in data amount than the mesh data, the communication cost may be sufficiently saved.

Figure 9:
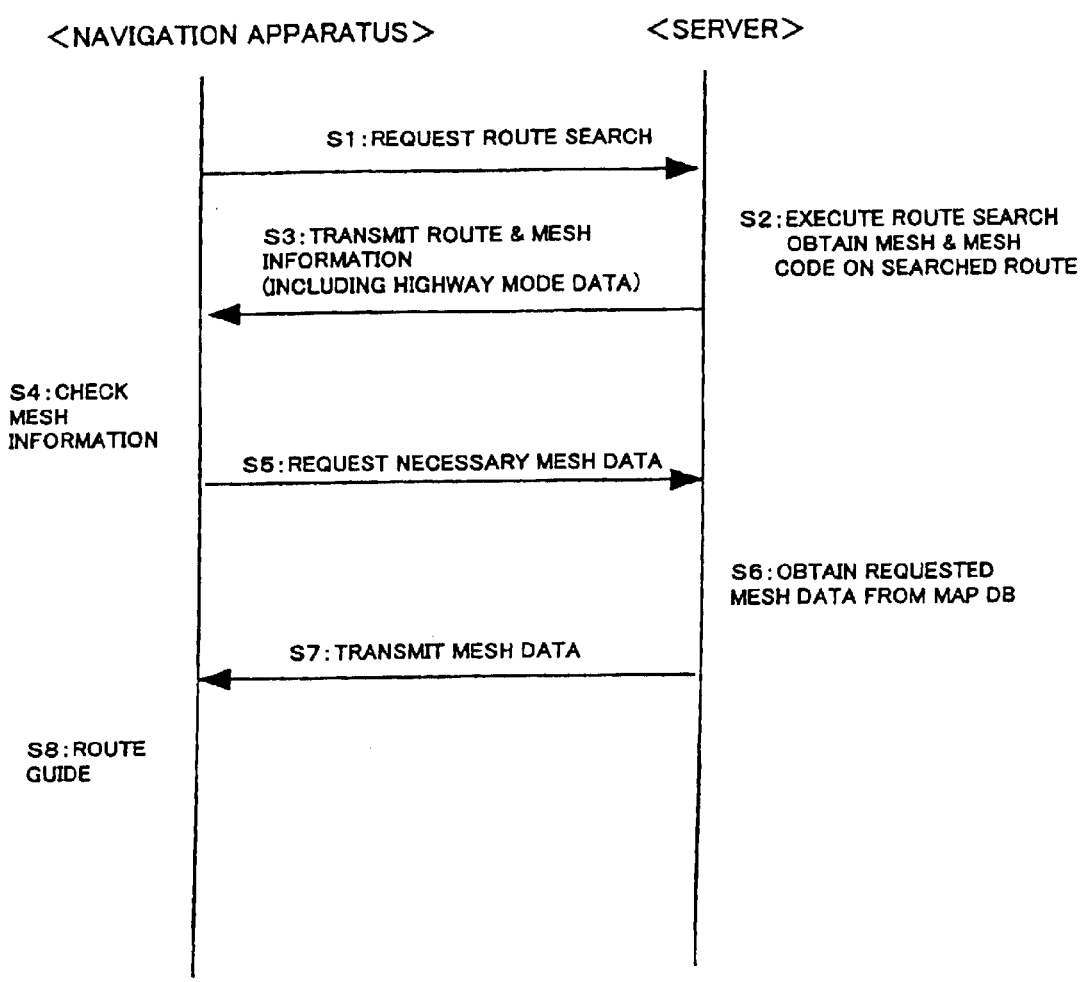
FIG. 9 is a flow chart showing the map data updating process according to the first example of the first embodiment.

Next, an example of the map data updating process in this case will be described with reference to FIGS. 9 to 11. FIG. 9 is a process flowchart showing the map data updating process according to a first example. First, the user of the navigation apparatus 7 operates the input device 60 to call the route search function, and designates the start point and the destination of the route search to issue the route search request (step S1). It is noted that, generally, the start point of the route search is automatically set to the current position of the vehicle installing the navigation apparatus 7, and the user designates only the destination in that case.

The server 101 executes the route search based on the information of the start point and the destination included in the route search request by utilizing the map data in the map DB 104. Then, the server 101 determines the meshes necessary to drive the searched route based on the route information obtained as a result of the route search, and obtains the mesh codes and the updating information for the meshes as well as the necessary highway mode data from the map DB 104 (step S2).

Figure 10:
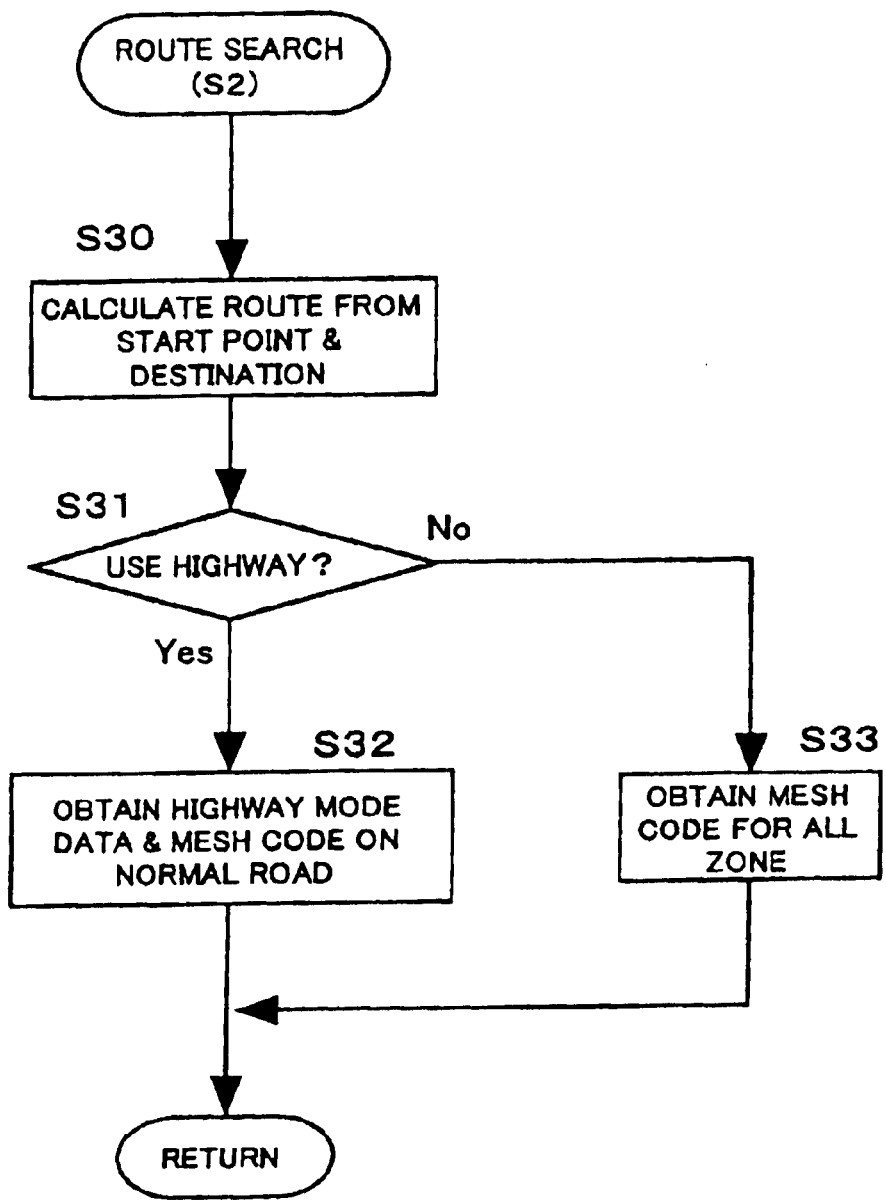
FIG. 10 is a flowchart showing route search process according to the first example of the first embodiment.

The process in step S2 is shown in FIG. 10. First, the server 101 calculates the route from the start point and the destination designated by the route search request (step S30), and determines whether or not the searched route includes highway or not (step S31). If the searched route does not include highway, the server 101 determines necessary meshes for the all zones of the searched route and obtains the mesh codes (step S33). On the other hand, if the searched route includes highway, the server 101 obtains the highway mode data corresponding to the highway zone and mesh codes of the meshes corresponding to the normal roads other than the highway (step S32).

Then, the server 101 transmits the route information, the highway mode data, and the mesh codes and the updating information of the searched route to the navigation apparatus 7 (step S3).

The navigation apparatus 7 receives the route information, the highway mode data, and the mesh codes and the updating information of the searched route. Then, the navigation apparatus 7 checks the mesh information by comparing the received mesh codes with the mesh data already been stored in the pre-install data storage unit 70 and the cache memory unit 71 in the data storage unit 36 (step S4).

Figure 11:
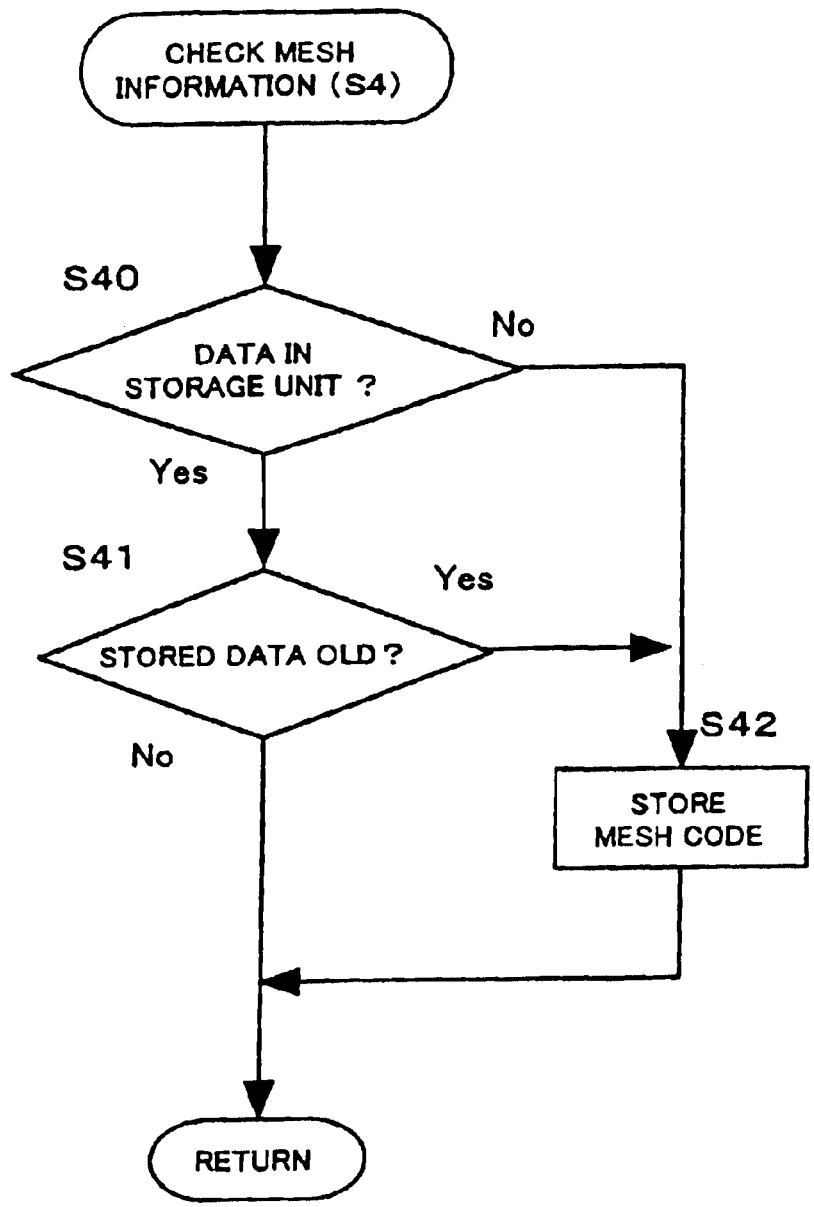
FIG. 11 is a flowchart showing mesh information check process according to the first example of the first embodiment.

The method of checking the mesh information is shown in FIG. 11. In FIG. 11, first the navigation apparatus 7 determines whether or not the mesh data corresponding to the received mesh codes already exist in the data storage unit 36 (step S40). If the received mesh codes include mesh codes that do not exist in the data storage unit 36 (step S40; No), the navigation apparatus 7 stores the mesh codes into the mesh code storage unit 72 (step S42).

Further, if the mesh data corresponding to the received mesh codes are already stored in the data storage unit 36 (step S40; Yes), the navigation apparatus 7 compares the updating information received together with the mesh codes with the updating information of the mesh data already stored in the data storage unit 36 (step S41). If the mesh data stored in the data storage unit 36 is older, the mesh code is stored in the mesh code storage unit 72. If the mesh data in the data storage unit is newer, the process ends because updating the mesh data is unnecessary. This process is executed for all mesh codes.

When the navigation apparatus 7 completes the check of the mesh information, the mesh codes of the mesh data needed to be obtained from the service center 6 in order to travel the normal road on the searched route are stored in the mesh code storage unit 72. In this case, the mesh codes stored in the mesh code storage unit 72 correspond to the meshes that do not exist in the data storage unit 36 and the meshes that exist in the data storage unit 36 but are old.

Referring back to FIG. 9, the navigation apparatus 7 designates the mesh codes stored in the mesh code storage unit 72 and transmits the request for the corresponding mesh data to the server 101 (step S5).

The server 101 obtains the requested mesh data from the map DB 104 (step S6), and transmits them to the navigation apparatus 7 (step S7). Thus, the newest map data (except for the highway) necessary to travel the searched route to the destination are all prepared in the navigation apparatus 7, and the navigation apparatus starts the route guide according to the searched route (step S8).

The route guide is performed in the highway mode based on the highway mode data transmitted from the server 101 in step S3 in the highway zone. Also, the normal detailed route guide is performed based on the newest map data thus updated in the normal road zone other than the highway zone. In this way, the map data along the searched route may be obtained and updated at the time of executing route search.

It is noted that, the steps S5 to S7 can be performed separately, not at one time. Namely, the navigation apparatus 7 may refer to the mesh code storage unit 72 during the travel along the searched route, and separately requests the mesh data one after another by designating the mesh code when it becomes necessary.

In the above description, all of the highway data are transmitted from the server 101 because they are small in data size. However, the highway mode data may be updated in the same manner as the mesh data. In that case, the server 101 transmits, not the highway mode data themselves, but the identification information (e.g., highway mode data code) of the highway mode data in step S3 in FIG. 9. The navigation apparatus 7 compares the identification information with the highway mode data already stored in the data storage unit 36 of the navigation apparatus 7, and requests and receives only new highway mode data.

In the above description, in the highway zone on the searched route, the route guide is performed in the highway mode by using the highway mode data. However, if the map data for broad area display is already stored in the data storage unit 36 of the navigation apparatus 7, those map data may be used instead of the highway mode data. The map data for broad area display is pre-installed as the map data for entire Japan, and relatively rough (directed to broad area) data compared with the mesh data used in the route guide. However, the map data for broad area may include major points such as highway, and hence it may be used instead of the highway mode data. By this, it is unnecessary for the server 101 to transmit the highway mode data to the navigation apparatus 7, and the communication cost may be further saved.

In the above description, it is supposed that the highway mode data is not stored in the navigation apparatus 7 at the initial time. However, if the highway mode data or other data that can be used for the same purpose is stored in the navigation apparatus 7 for a certain area (e.g., by pre-install process), the server 101 may only transmit the identification information of the highway data, instead of the highway mode data themselves, in step S3.

In the method shown in FIG. 9, the server 101 transmits the mesh codes of the meshes necessary to travel the searched route to the navigation apparatus 7, and the navigation apparatus 7 compares the received mesh codes with the mesh data already exist in the data storage unit 36. Alternatively, the server 101 may transmit only the route information of the searched route to the navigation apparatus 7. In that case, the navigation apparatus 7 specifies the necessary meshes for the searched route and notifies the updating information of those meshes existing in the data storage unit side. The server 101 compares the updating information and transmits only the new mesh data to the navigation apparatus 7. The necessary mesh data may be obtained and updated in this way.

While the above description is directed to the use of highway, this embodiment may be applied to other toll roads in which similar display mode may be performed. It is appreciated that the word "highway" includes the above mentioned toll road and the like.

(1-3-2) 2ND EXAMPLE

Next, a second example of the map data updating process will be described. In the first example, if the searched route includes highway, the route guide is performed in the highway mode in the highway zone so that the map data amount to be obtained from the server 101 is reduced. In the second example, based on the similar idea, necessary data amount may be reduced by using the guide view mode in the searched route including only normal roads.

As described above, the guide view mode only displays the guide information such as driving information (e.g., left-turn, right-turn at intersection) at the next route point along the searched route, and displays no map data. Therefore, by using the guide view mode, it is unnecessary to obtain and update a lot of map data on the searched route by communication.

In this case, the zone in which the guide view mode is used may be determined by some methods. One method is to use the guide view mode for all of the searched route. By this, instead of obtaining new mesh data or updating mesh data, the guide view mode data of small data size may be obtained, thereby reducing the communication cost. This method is advantageous when the user travels unfamiliar area because it is unnecessary to obtain and update mesh data that the user rarely uses and the guide view mode data may be used alternatively to those mesh data.

Another method is to normally obtain and update mesh data for a predetermined area around the destination designated by the user, and to use the guide view mode for other area. By this method, since the user can drive along the searched route without trouble according to the guide view mode on the way to the destination, the guide view mode may be used to save the communication cost. Then, since the detailed route guide is performed based on the newest mesh data near the destination, the user can correctly arrive at the destination.

Still another method is that the user individually designates zones on the searched route for which the guide view mode is used, and thus new mesh data is not obtained to save the communication cost.

Still another method is to use the guide view mode when the vehicle runs on an arterial road for a long time according to the searched route. This is based on the same idea as the first example. Since no detailed map data is required to be displayed on the arterial road, the guide view mode is used to save the communication cost.

(1-3-3) OTHER EXAMPLES

Other than the above-described methods, by obtaining and updating the road data of the arterial roads in the mesh data, the communication cost may be saved as compared with the case in which mesh data including all road data is obtained. The meshes for which the only the road data of arterial road is obtained may be determined in various ways. Namely, mesh data including all roads are obtained by the updating for the area around the destination, and the mesh data including only the arterial road are obtained for other areas. Alternatively, the mesh data including only the arterial roads are obtained for the zones designated by the user, or alternatively the mesh data including only the arterial roads are obtained for the zones in which the vehicle travels on the arterial roads according to the searched route.

Further, instead of the guide view mode in the second example, the communication cost may be saved by providing the guidance information in the form of characters describing the travel route and/or voice guidance within a certain zone in the searched route. The route guide in the form of characters may be, for example, displaying route explanation such as "Get off at D interchange of C highway", or "Turn left at F intersection on E national road" according to the travel situation of the vehicle. Also, the voice guidance may be a voice message providing the route guide, e.g. "Turn left at F intersection". The character guidance and the voice guidance may be used in combination. In this case, the zones in which the character/voice route guide is to be performed maybe determined in various ways described above.

According to the first embodiment, necessary map data may be efficiently obtained and updated in association with the route search.

[2nd Embodiment]

Next, a second embodiment of the present invention will be described.

(2-1) Map Data
(2-1-1) Mesh Data

The data structure of the mesh data according to the second embodiment is the same as that in the first embodiment described above with reference to FIGS. 4 and 6. Therefore, the description thereof will not be repeated.

(2-1-2) Block of Meshes

Figure 13:
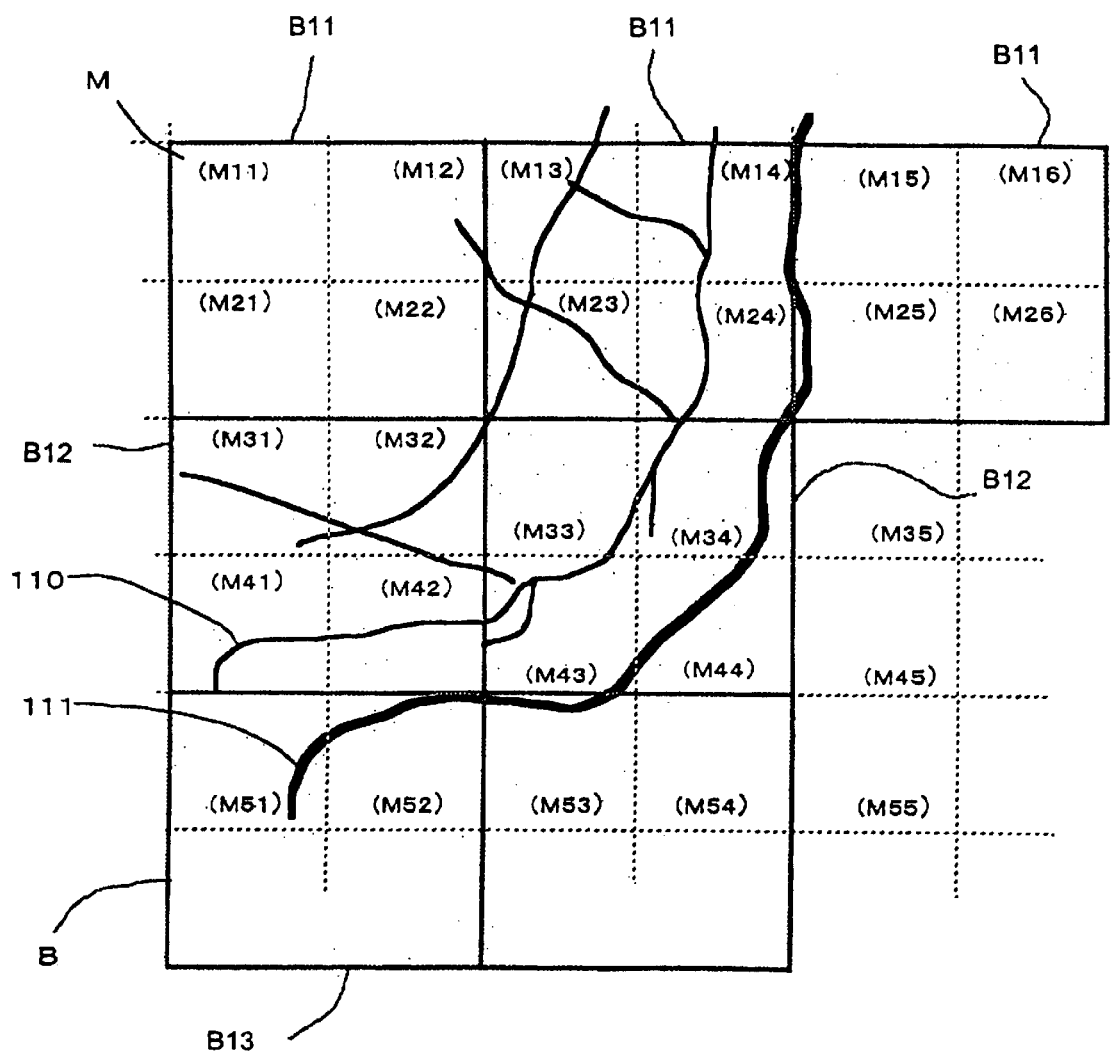
FIG. 13 shows example of blocks of meshes according to the second embodiment.

Next, the block of the meshes will be described. By forming a block by a plurality of mesh data, the map data may be processed by the block unit. FIG. 13 shows the block of the meshes.

In the example of FIG. 13, four meshes form one block. For example, the meshes M11, M12, M21 and M22 form the block B1. It is noted that FIG. 13 shows merely an example of blocks of meshes, and predetermined number of meshes aligned in vertical or horizontal direction may form one block. In addition, the number of meshes forming one block may be arbitrarily determined.

FIG. 14 shows an example of block management information. As shown, each block has the block code which is an identification information of block. Further, the block management information prescribes the mesh codes that form each block. For each block, the scale information of the block and the updating information of the block are stored.

The updating information of the block is set based on the updating information of the meshes included in the block. Since the plurality of mesh data to form block are neighboring to each other, they are generally updated at the same time. Therefore, normally, the updating information of the plural mesh data included in a single block are the same, and the updating information is set to the updating information of that block. However, if the plural mesh data in a single block have different updating information, the newest updating information of those mesh data is set to the updating information of the block so that the mesh data is updated frequently.

It is noted that the block management information is stored in the map DB 104 in the service center 6 and the data storage unit 36 of the navigation apparatus 7.

(2-2) Configuration of Data Storage Unit

The configuration of the data storage unit 35 according to the second embodiment is the same as that in the first embodiment described with reference to FIG. 7, and hence the description therefore will be omitted.

(2-3) Map Data Updating Process

Next, the map data updating process according to the second embodiment will be described. In the following map data updating process, when a user using the navigation apparatus 7 instructs route search, the navigation apparatus 7 obtains newest map data (mesh data) associated with the travel route determined by the route search. The route search process is basically executed by the server 101 in the service center 6. Since the route search process itself is known, the detailed described thereof will be omitted.

In the following description, it is premised that the pre-install data storage unit 70 of the navigation apparatus 7 that the user is using already stores a certain range of map data, and further map data of certain area are stored in the cache memory unit 71 during the user of the navigation apparatus 7 after the pre-install process is finished.

(2-3-1) 1ST EXAMPLE

Figure 15:
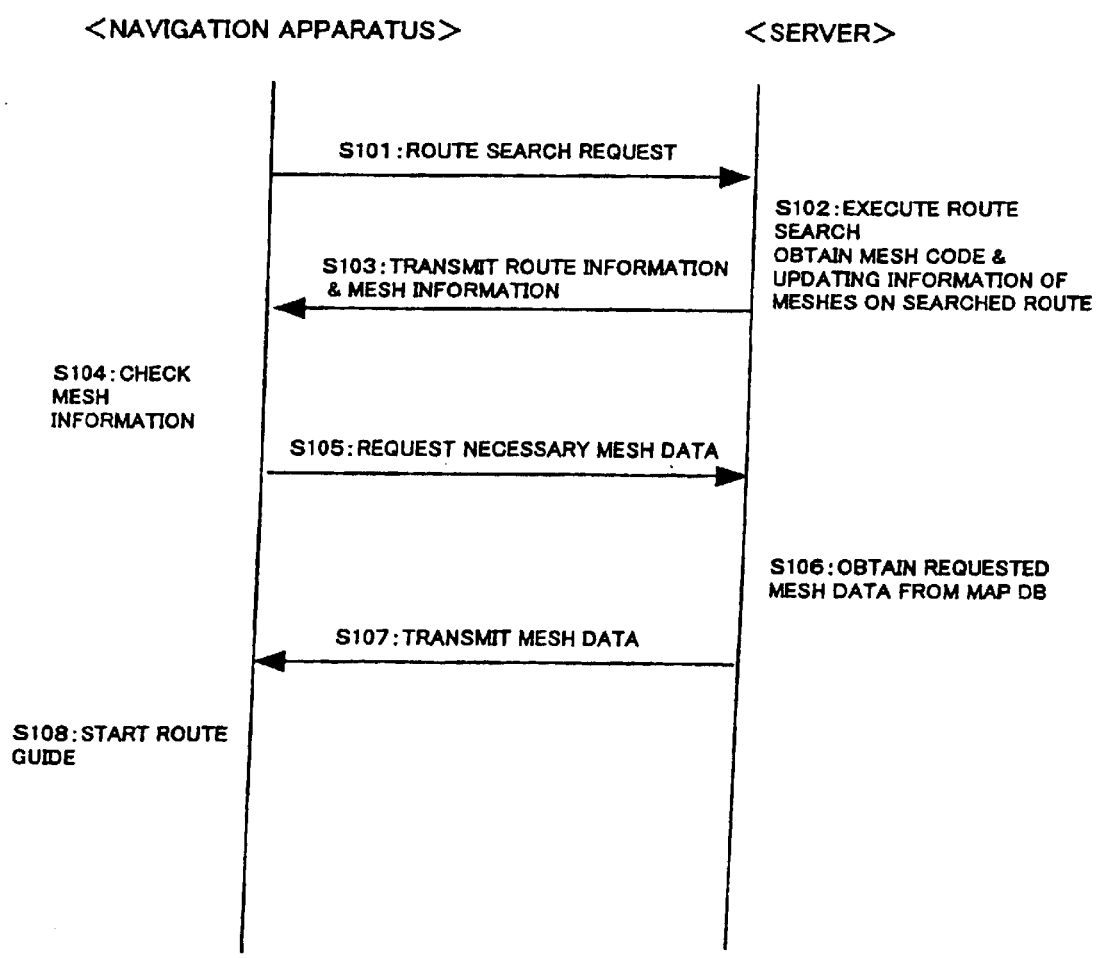
FIG. 15 is a flowchart of map data updating process according to a first example of the second embodiment.

A first example of the map data updating process according to the second embodiment will be described with reference to FIG. 15. FIG. 15 is a process flowchart showing the map data updating process according to a first example of the second embodiment.

First, the user of the navigation apparatus 7 operates the input device 60 to call the route search function, and designates the start point and the destination of the route search to issue the route search request (step S101).

The server 101 executes the route search based on the information of the start point and the destination included in the route search request by utilizing the map data in the map DB 104. Then, the server 101 determines the meshes necessary to drive the searched route based on the route information obtained as a result of the route search, and obtains the mesh codes and the updating information for the meshes from the map DB 104 (step S102).

Then, the server 101 transmits the route information, and the mesh codes and the updating information of the searched route to the navigation apparatus 7 (step S103).

The navigation apparatus 7 receives the route information, and the mesh codes and the updating information of the searched route. Then, the navigation apparatus 7 checks the mesh information by comparing the received mesh codes with the mesh data already been stored in the pre-install data storage unit 70 and the cache memory unit 71 in the data storage unit 36 (step S104).

The method of checking the mesh information the same as that of the first embodiment described with reference to FIG. 11, and hence the description will be omitted.

When the navigation apparatus 7 completes the check of the mesh information, the mesh codes of the mesh data needed to be obtained from the service center 6 in order to travel the searched route are stored in the mesh code storage unit 72. In this case, the mesh codes stored in the mesh code storage unit 72 correspond to the meshes that do not exist in the data storage unit 36 and the meshes that exist in the data storage unit 36 but are old.

Then, the navigation apparatus 7 designates the mesh codes stored in the mesh code storage unit 72 and transmits the request for the corresponding mesh data to the server 101 (step S105).

The server 101 obtains the requested mesh data from the map DB 104 (step S106), and transmits them to the navigation apparatus 7 (step S107). Thus, the newest map data (except for the highway) necessary to travel the searched route to the destination are all prepared in the navigation apparatus 7, and the navigation apparatus starts the route guide according to the searched route (step S108).

The above method has the following advantages. First, since the calculation to determine the meshes along the searched route is executed by the server 101, the operation burden of the navigation apparatus 7 may be reduced. Normally the server 101 has much higher capability of operation than that of the navigation apparatus 7, and hence the calculating the meshes along the searched route may be quickly executed. Also, it is unnecessary to prepare the program to calculate the meshes along the searched route on the navigation apparatus 7 side.

In step S104, the navigation apparatus 7 checks the updating information of the meshes along the searched route to specify the mesh data to be updated. If no mesh data is to be updated after the check (i.e., newest data of the respective meshes are already stored in the navigation apparatus side), the process after step S105 may be omitted. In that case, the communication cost may be saved.

Next, a modification of the first example will be described. In the flowchart shown in FIG. 15, after specifying the meshes to be updated in step S104, the navigation apparatus 7 requests the mesh data for all of them, and updates the corresponding mesh data to complete the updating. However, actually the destination may be changed before starting or during the travel along the searched route, and hence it is likely the vehicle does not travel along the searched route to the destination. In such a case, the map data may be wasted if they are obtained from the server before staring the travel along the searched route. Therefore, all of the necessary mesh data are not obtained prior to the travel, and the navigation apparatus 7 obtains the necessary mesh data one by one little during traveling, in the following manner.

When the check is completed in step S104, the mesh codes of the mesh data to be obtained are stored in the mesh code storage unit 72. The navigation apparatus 7 starts the route guide according to the searched route, and obtains the mesh data to be displayed from the data storage unit 36 based on the current position of the vehicle and displays them. Before obtaining the mesh data from the data storage unit 36, the navigation apparatus 7 judges whether or not the mesh code of the mesh data to be used next is in the mesh code storage unit 72. If it is in the mesh code storage unit 72, steps S105 to S106 are executed for the mesh to obtain the new mesh data from the server 101, and uses it for the route guide. By this, if the user does not travel to the destination along the searched route, it is possible to avoid wasting the communication cost by obtaining mesh data that are not used.

(2-3-2) 2ND EXAMPLE

Figure 16:
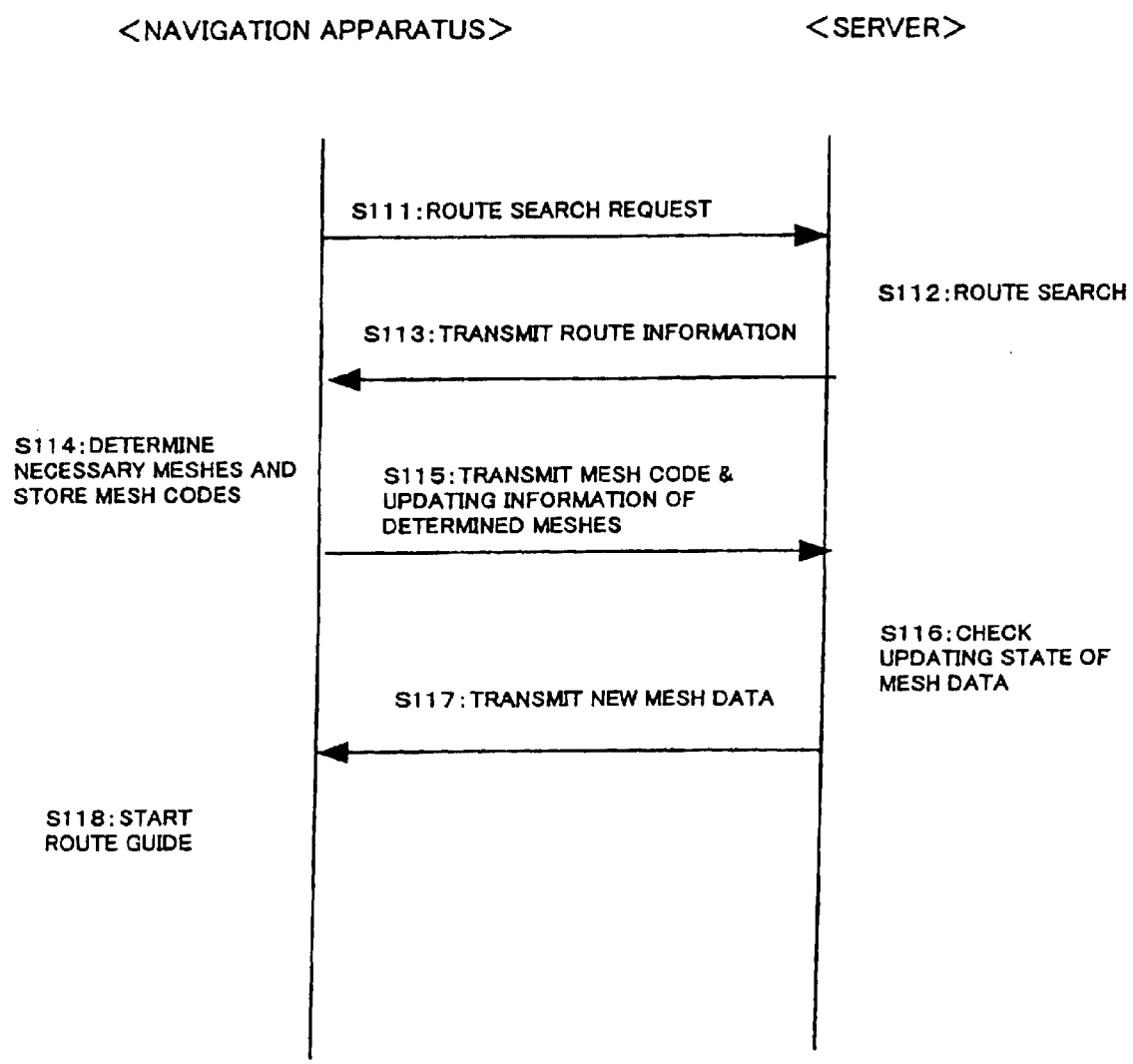
FIG. 16 is a flowchart of map data updating process according to a second example of the second embodiment.

A second example of the map data updating process according to the second embodiment will be described with reference to FIG. 16. FIG. 16 is a process flowchart showing the map data updating process according to a second example of the second embodiment.

First, the user of the navigation apparatus 7 operates the input device 60 to call the route search function, and designates the start point and the destination of the route search to issue the route search request (step S101).

The server 101 executes the route search based on the information of the start point and the destination included in the route search request by utilizing the map data in the map DB 104 (step S112). Then, the server 101 transmits the route information obtained by the route search to the navigation apparatus 7 (step S113).

The navigation apparatus 7 calculates the meshes necessary to travel along the searched route based on the route information of the searched route (step S114). It is noted that this step is executed by the server 101 in the above-described first example of the second embodiment.

Then, the navigation apparatus 7 temporarily stores the mesh codes for the meshes necessary to travel along the searched route in the mesh code storage unit 72, and obtains the mesh code and mesh attribute information from the data storage unit 36 to transmit them to the server 101 (step S115).

The server 101 receives the mesh code and the mesh attribute information, and checks whether or not new mesh data corresponding to those meshes exist by referring to the map DB 104 (step S116). This check is performed by comparing the updating information corresponding to the mesh codes transmitted from the navigation apparatus 7 with the updating information of the same meshes stored in the map DB 104. Then, if new mesh data exist in the map DB 104, the server 101 obtains the new mesh data from the map DB 104 and transmits them to the navigation apparatus (step S117).

Thus, the navigation apparatus can obtain new mesh data for the meshes along the searched route. Thereafter, the navigation apparatus 7 performs the route guide along the searched route (step S118).

According to this example, since the navigation apparatus calculates the meshes along the searched route, the operation burden of the server 101 may be reduced. The server 101 is sometimes required to simultaneously communicate with many navigation apparatuses 7, and hence the method of this example is advantageous when the server 101 is busy.

In the above description, the mesh codes and the updating information of all meshes on the searched route are transmitted to the server 101 (step S115). The server 101 checks the updating information of the mesh data (step S116), and the navigation apparatus 7 receives new mesh data (step S117). Alternatively, like the modification of the first example, the navigation apparatus 7 may transmit the mesh codes and updating information of the meshes one by one when it becomes necessary and obtain the new mesh data. In that case, since the mesh codes of the meshes on the searched route are stored in the mesh code storage unit 72 in step S114, the navigation apparatus 7 may transmit the mesh code and the updating information like step S115 by referring to the mesh code storage unit 72 when the mesh to be displayed is determined, while performing the route guide.

(2-3-3) 3RD EXAMPLE

Next, a third example of the map data updating process will be described. In the third example, the methods of the first example and the second example are switched in accordance with the busy state of the communication and/or processing burden of the operation of the server. The server 101 recognizes the current level of the busy state of the communication with the navigation apparatuses 7 and/or operation processing burden (hereinafter referred to as "processing burden"). Therefore, the server 101 judges the processing burden in the server 101 when receiving the route search request from the navigation apparatus 7. The server 101 performs the method of the first example when the processing burden is lower than a predetermined level, and performs the method of the second example when the processing burden is higher than the predetermined level.

By this, when the processing burden in the server 101 is low, the arithmetic operation in the server 101 is increased to efficiently perform the arithmetic operation. On the other hand, when the processing burden in the server 101 is high, if the arithmetic operation by the server 101 takes time and the response by the server is delayed, the communication cost of on the navigation apparatus 7 is increased. Therefore, the navigation apparatus 7 executes the necessary arithmetic operation to quickly update necessary map data.

(2-3-4) 4TH EXAMPLE

Figure 17:
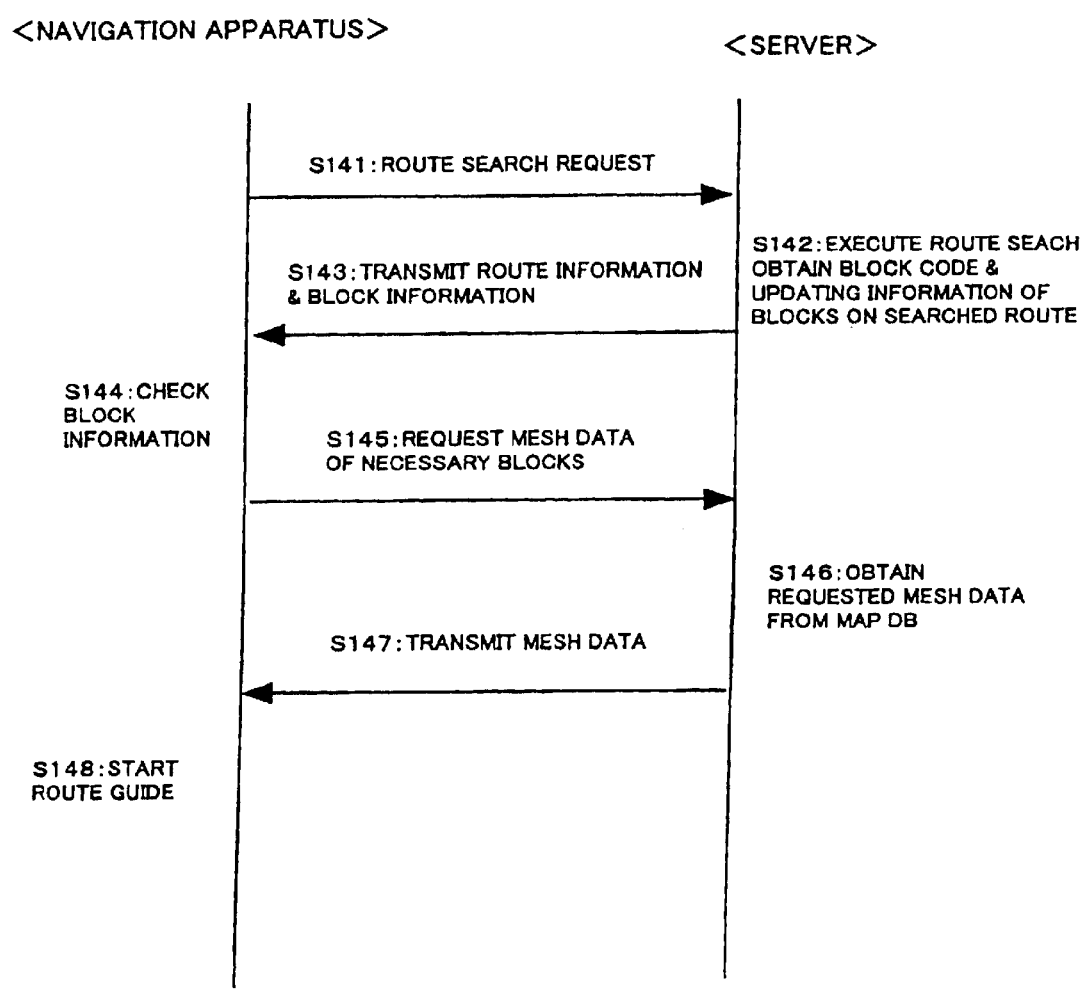
FIG. 17 is a flowchart of map data updating process according to a fourth example of the second embodiment.

The fourth example updates the map data by using the blocks described above. FIG. 17 shows the flowchart of the map data updating process according to this example.

First, the user of the navigation apparatus 7 operates the input device 60 to call the route search function, and designates the start point and the destination of the route search to issue the route search request (step S141).

The server 101 executes the route search based on the information of the start point and the destination included in the route search request by utilizing the map data in the map DB 104. Then, the server 101 specifies the blocks including the searched route based on the route information obtained by the route search, and obtains the block codes and the updating information from the map DB 104 (step S142).

Then, the server 101 transmits the route information, and the block code and updating information of the searched route to the navigation apparatus 7 (step S143).

The navigation apparatus 7 receives the route information, and block code and updating information.

Then, the navigation apparatus 7 refers to the block management information shown in FIG. 14, compares the received block codes and updating information with the mesh codes and updating information of the mesh data already stored in the pre-install data storage unit 70 and the cache memory unit 71 of the data storage unit 36, thereby to check the block information (step S144).

In checking the block information, the navigation apparatus first judges whether or not the mesh data included in the blocks indicated by the received block codes exist in the data storage unit 36. If the mesh data included in the block are not stored in the data storage unit 36 yet, those mesh codes are stored in the mesh code storage unit 72.

On the other hand, if the mesh data included in the blocks corresponding to the received block code exist in the data storage unit 36, the navigation apparatus 7 compares the updating information of the block (normally, identical to the updating information of the mesh data in the block) with the updating information of the mesh data stored in the data storage unit 36. If the updating information of the mesh data stored in the data storage unit 36 is older, the mesh codes are stored in the mesh code storage unit 72.

By this, in the mesh code storage unit 72, out of the meshes included in the blocks transmitted by the server 101, the mesh codes of the meshes which are not stored in the data storage unit 36 and the mesh codes of the mesh data which updating information is older than the updating information of the mesh data transmitted by the server 101 are stored.

Then, the navigation apparatus 7 designates the mesh codes stored in the mesh code storage unit 72 to transmit the request of the corresponding mesh data to the server 101 (step S145).

The server 101 obtains the requested mesh data from the map DB 104 (step S146), and transmits it to the navigation apparatus 7 (step S147). Thus, the newest map data necessary to travel the searched route to the destination are all prepared in the navigation apparatus 7, and the navigation apparatus starts the route guide according to the searched route (step S148). Thus, the map data on the searched route may be obtained and updated.

According to this example, the server 101 detects the blocks including the searched route in step S142 and transmits the block codes to the navigation apparatus 7, and hence the transmitted data amount is smaller than the case in which the mesh codes of the meshes including the searched route. For example, it is assumed that the searched route includes the road 110 shown in FIG. 13. If the mesh codes are transmitted for the block B22, the mesh codes M33, M34, M43 and M44 as well as the updating information of the mare transmitted to the navigation apparatus 7. On the contrary, according to this example, only the block code B22 and the updating information of the block B22 are transmitted to the navigation apparatus 7. Therefore, data amount to be transmitted from the server 101 to the navigation apparatus 7 is may be decreased, and the communication cost may be reduced.

Further, according to this example, updating the map data can be advantageously accelerated. For example, in FIG. 13, assuming that the road 110 is included in the searched route, if the data storage unit 72 of the navigation apparatus 7 does not include the newest mesh data, all mesh data in the block B21 are obtained and updated. In this case, while the road 110 does not actually passes the meshes M31 and M32, they are updated together with the meshes M41 and M42 because the block B21 includes the M31 and M32. Therefore, as a result of the route search, the mesh data around the searched route can be efficiently updated by the block unit.

While steps S145 to S147 are executed at one time, alternatively, the navigation apparatus 7 may obtain necessary mesh data one by one by executing the steps S145 to S147 at the necessary timing, while executing the route guide. By this, it is possible to prevent the obtained data from being wasted when the user does not travel the searched route to its destination.

(2-3-5) 5TH EXAMPLE

Next, the fifth example of the second embodiment will be described. The fifth example performs the map updating by the unit of the blocks, similarly to the fourth example. However, the fifth example differs from the fourth example in that the process of determining the block along the searched route is executed by, not the server 101, but the navigation apparatus 7.

Figure 18:
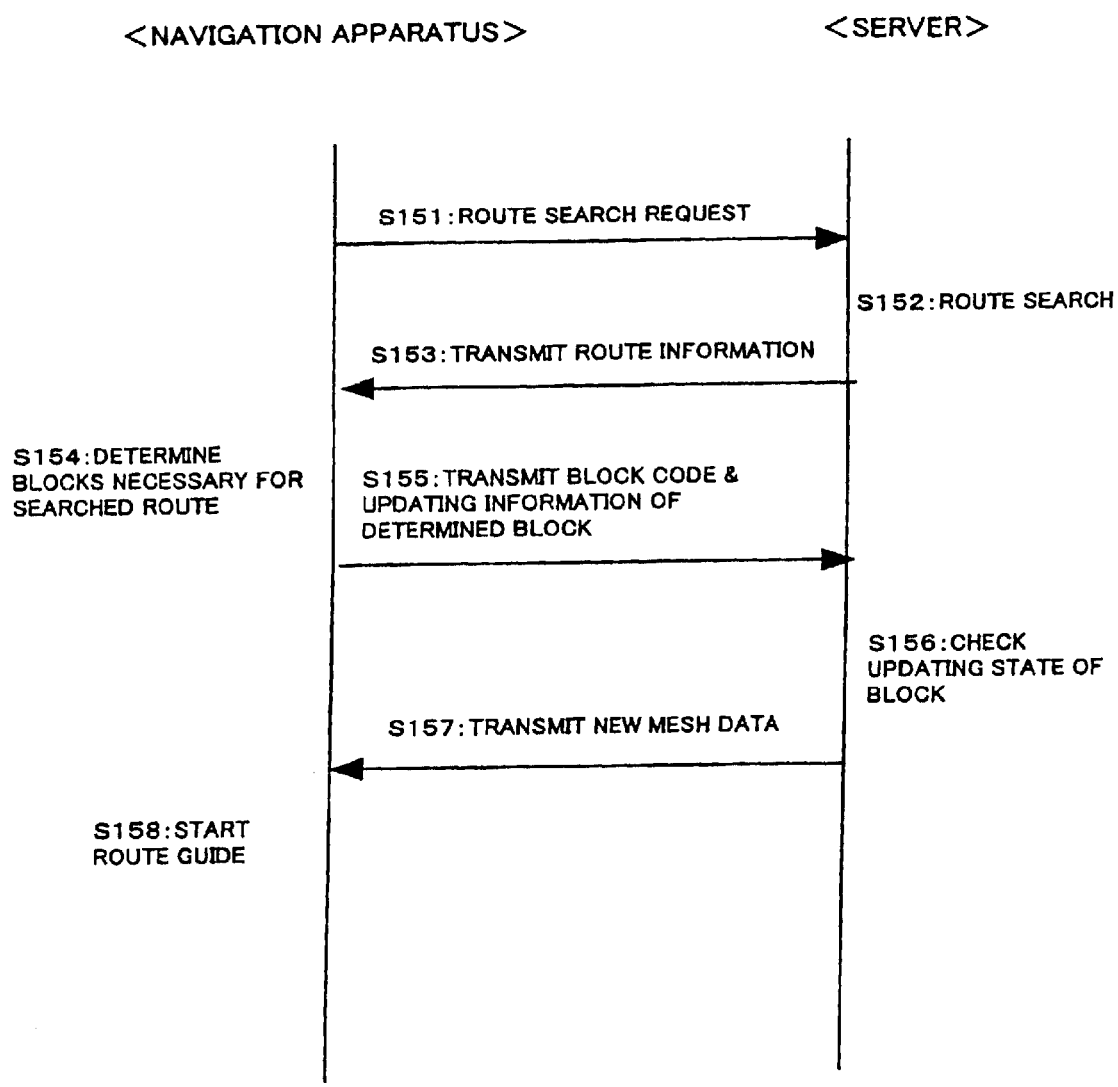
FIG. 18 is a flowchart of map data updating process according to a fifth example of the second embodiment.

FIG. 18 shows the flowchart of the fifth example. When the user instructs the route search (step S151), the server 101 executes route search (step S152), and transmits the route information to the navigation apparatus 7 (step S153).

The navigation apparatus 7 determines the blocks including the searched route based on the route information (step S154), and transmits the block codes and the updating information of the blocks to the server 101 (step S155). It is noted that, in this case, the block management information in the navigation apparatus 7 only includes the information of blocks for mesh data stored in the navigation apparatus 7.

The server 101 checks the updating information of the block codes thus received (step S156), and transmits the mesh data of the blocks having updating information newer than the received updating information (step S157). The navigation apparatus 7 receives the mesh data and performs the route guide (step S158).

As described above, the block code and updating information of block unit are transmitted and the updating information is checked, and hence the data may be efficiently updated.

While steps S155 to S157 are executed at one time, alternatively, the navigation apparatus 7 may obtain necessary mesh data one by one by executing the steps S155 at the necessary timing, while executing the route guide. By this, it is possible to prevent the obtained data from being wasted when the user does not travel the searched route to its destination.

3rd Embodiment

Next, a third embodiment of the present invention will be described.

(3-1) Map Data

The map data is produced by a unit obtained by dividing a certain geographical region into a plurality of blocks each having a predetermined area. As mentioned, this unit is called "mesh", and a unit of the map data corresponding to one mesh is called "mesh data". The map data is an aggregation of mesh data.

FIG. 4 schematically shows an example, wherein map of a certain region along a shore is divided into a plurality of meshes.

Figure 19:
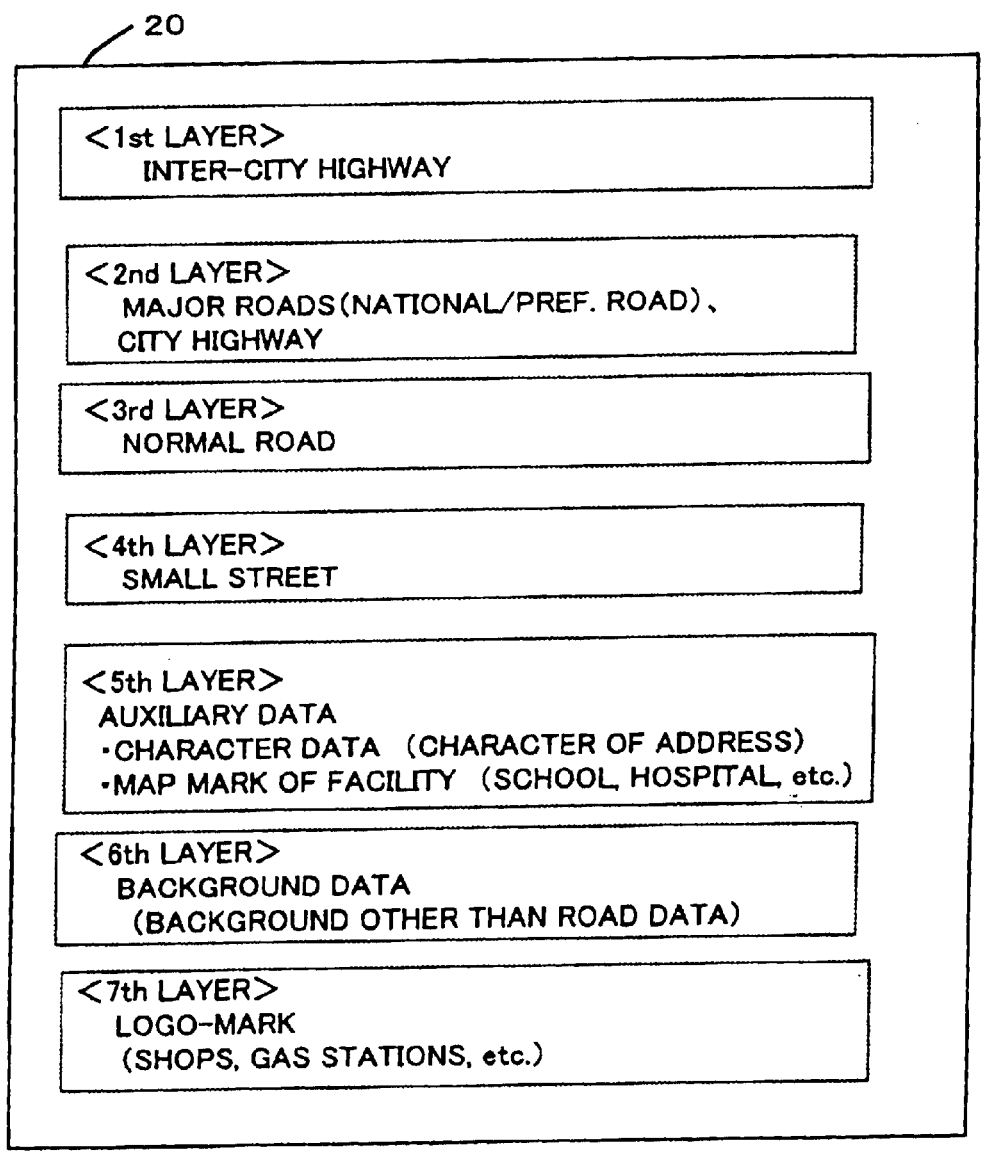
FIG. 19 shows a configuration of map data according to the third embodiment.

FIG. 19 shows an example of contents of the mesh data. The mesh data used by the navigation apparatus 7 according to the third embodiment includes seven layers (data layers), and each layer can be processed independently of other layers. Namely, not only all layers are obtained and processed for one mesh, some of the layers may be arbitrarily selected and used.

The first to fourth layers has road data, specifically vector data representing roads on the map. The first layer has data of inter-city highway, and includes data of major highway connecting large cities, such as the Tokyo-Nagoya highway, the central highway. The second layer has data of major roads and highways, and includes national roads, major prefectural road, in-city highways such as a capital highway. The third layer has data of national roads, and includes data of roads associated with national roads and prefectural roads. The fourth layer has small street data, and includes data of roads smaller than the normal roads included in the third layer.

The fifth layer includes auxiliary data. The auxiliary data corresponds to the characters, symbols, marks and the like shown within the map, and includes character data and geographical marks. The navigation apparatus 7 displays map with geographical names, addresses, intersection names, station names and the like in the form of characters, and the character data represents those characters. The map may sometimes include map marks such as schools, hospitals, post offices and so on, and the se are included in the data representing map marks of facilities.

The sixth layer includes background data. The background data represents the area, other than the roads, in the region shown as the map data. The navigation apparatus 7 displays map of roads together with the situation around the road. For instance, a picture of a pond is displayed if there is a pond near a road, and the geographical sections are shown on the map in an urban area. These are included in the background data.

The seventh layer includes logo-mark. The logo-mark is a mark representing a shop and/or a gas station, for example.

As described above, the mesh data is basically configured by independent data (hereinafter also referred to as "layer data") of seven layers.

However, there are regions for which those data do not exist. For instance, the mesh data of an area in which no inter-city highway passes does not include the first layer. Also, since the mesh M55 shown in FIG. 4 completely corresponds to the sea, no road, facility and shop exists. Therefore, the mesh data of mesh M55 does not include the road data of the first to fourth layers, the auxiliary data of the fifth layer and the logo-mark data of the seventh layer, and includes only the background data of the sixth layer. As the image of displayed map, the mesh M55 is shown as a simple blue area representing the sea, and the background data showing such blue sea area is included in the mesh data M55.

As appreciated, the data amount of each mesh data is different from each other. For example, the mesh data of the meshes M43 and M34 has large data amount because they include many roads intersected and shoreline. On the contrary, the mesh data of the mesh M55 completely corresponding to the sea or the mesh M11 completely corresponding to the mountain area (with no road) has small data amount.

Further, in one mesh data corresponding to one mesh, the data amounts of the respective layers are different. For example, since one mesh does not include so many inter-city highways, generally the first layer does not have so much data amount. On the contrary, the many normal roads and streets exist in a city area wherein many buildings are concentrated, and the data amount of the third and/or fourth layers for one mesh may be large. Basically, as one mesh includes many roads, the data amount of the road data becomes large. Also, in business or shopping quarters having many shops, the data amount of the fifth layer including the auxiliary data and the seventh layer including logo-marks become large.

As to the layer data, average data amount of each layer may be statistically determined to some degree. For example, it is possible to statistically grasp average data amount of each layer, e.g., the first layer has such data amount, and the fourth layer has such amount, and soon. This average data amount may be used for an efficient data obtaining method described layer.

As described above, the map data includes a plurality of mesh data for each scale, and one mesh data includes a plurality of layer data. Therefore, the navigation apparatus 7 obtains the map data from the service center 6 by the unit of the layer data in the mesh data. Namely, the navigation apparatus 7 receives the layer data of the necessary mesh data from the service center 6 and stores it in the data storage unit 36 in the navigation apparatus 7. Thus, necessary data are accumulated in the navigation apparatus 7.

(3-2) Data Structure of Map DB

FIG. 20 schematically shows contents of the map data stored in the map DB 104 of the service center 6 according to the third embodiment. As mentioned, the map data is an aggregation of mesh data prepared for predetermined scales, and each layer data is an aggregation of a plurality of layer data. In the following description, "mesh data" represents data corresponding to one mesh, and "layer data" represents data of a certain layer included in the mesh data.

Each mesh data has mesh code (M11, M12, . . . ) serving as identification number of the mesh. Further, each layer data is expressed by a mesh code with layer number. Namely, the mesh code M11-1 represents the first layer of the mesh M11, and the mesh code M11-2 represents the second layer of the mesh M11. One layer data includes data file which is main portion of the map data, and scale information and updating information serving as attribute information of each mesh data.

The mesh data is prepared for each scale, and each layer data is associated with the scale information of the mesh. The updating information indicates whether the layer data is old or new, and represents the updating date in this example. Since the map data may be processed and handled by the unit of the layer data, if one layer data of one mesh is updated, only the layer data has new updating date. Alternatively to the updating date, other information such as version information of the map may be used as the updating information. By comparing the updating information of the respective layer data, the layer data can be updated.

(3-3) Configuration of Data Storage Unit

The configuration of the data storage unit 36 according to the third embodiment is the same as that in the first embodiment described with reference to FIG. 7, and hence the description therefore will be omitted.

(3-4) Map Data Obtaining Process

Next, the map data obtaining process will be described. In the following map data obtaining process, when the user using the navigation apparatus 7 instructs the route search, the navigation apparatus 7 obtains newest map data (mesh data or layer data) associated with the searched route. It is noted that the route search is basically performed by the server 101 in the service center 6. Since the route search process itself is a known art, the detailed description thereof will be omitted.

In the following description, it is premised that the pre-install data storage unit 70 of the navigation apparatus 7 that the user is using already stores a certain range of map data, and further map data of certain area are stored in the cache memory unit 71 during the user of the navigation apparatus 7 after the pre-install process is finished.

(3-4-1) 1ST EXAMPLE

The first example of the map data obtaining process according to the third embodiment will be described. In the first example, when the user instructs the route search with certain conditions, the server 101 provides appropriate mesh data or layer data adapted to the conditions to the navigation apparatus 7.

In this example, the mesh data includes a plurality of layer data, and each layer data can be processed independently of each other. Therefore, the navigation apparatus 7 obtains only the data of the necessary layers from the server 101 via by communication when the server 101 provides the route guide. Thus, the navigation apparatus 7 can obtain map data efficiently, and the communication cost required to obtain the map data may be reduced.

Figure 21:
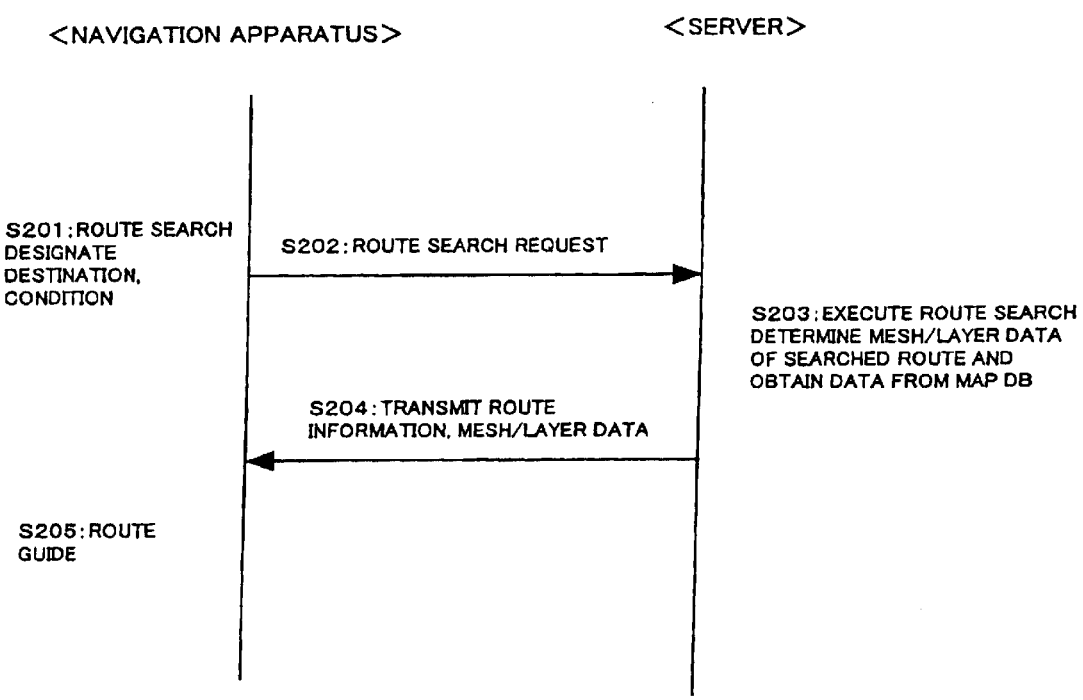
FIG. 21 is a flowchart of map data updating process according to a first example of the third embodiment.

FIG. 21 is a flowchart showing the data obtaining process according to this example. In FIG. 21, first the user of the navigation apparatus 7 operates the input device 60 to call the route search function, designates the start point and destination for the route search, further designates route search conditions if necessary (step S201), and sends the route search request (step S202). In general, the start point of the route search may be automatically set to the current position of the vehicle carrying the navigation apparatus 7, and the user needs designate only the destination in that case.

The server 101 performs route search by using the road data in the map DB 104 based on the start point and the destination included in the route search request. Here, the server 101 efficiently obtains the mesh data and the layer data associated with the searched route by taking advantage of the nature of the mesh data that is configured by the aggregation of the plural layer data. Then, the server 101 specifies meshes necessary to drive the searched route based on the route information produced by the route search, and obtains necessary mesh data and layer data from the map DB 104 (step S203). Subsequently, the server 101 transmits the mesh data and the layer data to the navigation apparatus 7, together with the route information produced by the route search (step S204).

The navigation apparatus 7 receives the route information, the mesh data and the layer data, and performs the route guide (step S205).

Next, the description will be given of some methods of efficiently obtaining mesh data and layer data associated with the searched route.

The first method is to obtain the mesh data including all layers for the meshes including the searched route, and obtain only relatively rough road data, e.g., data of the first and the second layers, for the meshes neighboring the meshes including the searched route.

Figure 22:
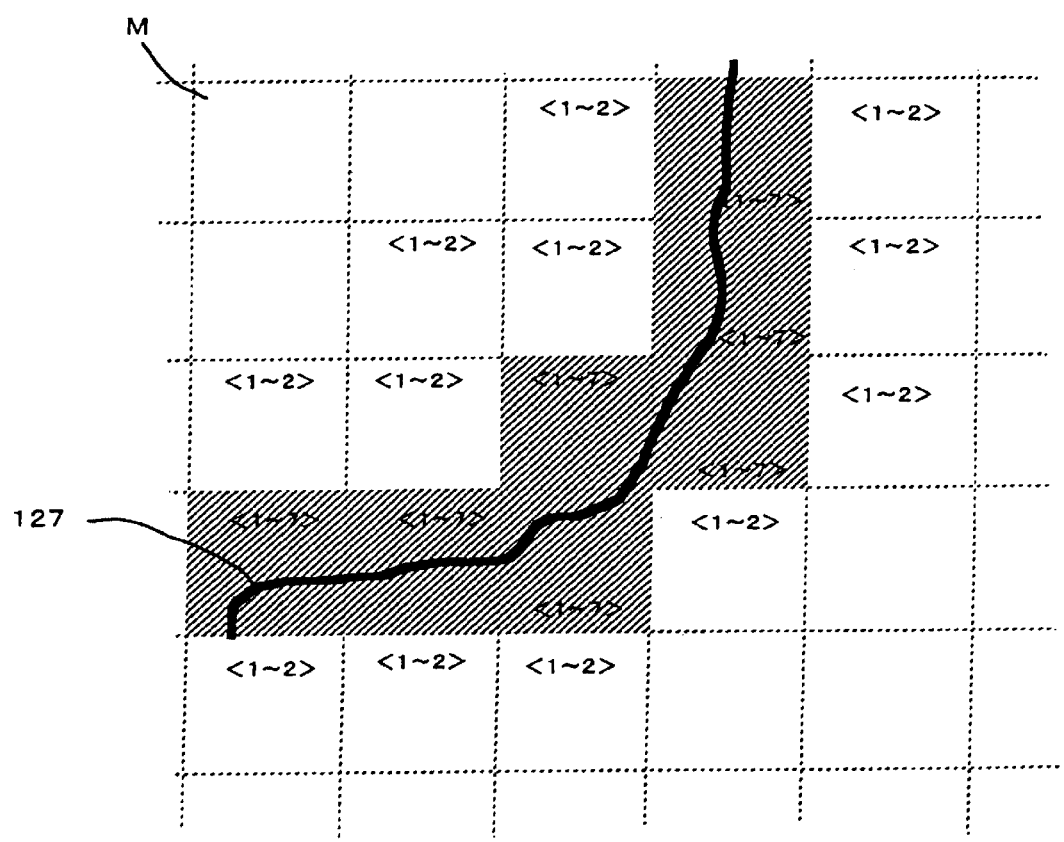
FIG. 22 schematically shows a first method of obtaining mesh data or layer data according to the third embodiment.

FIG. 22 schematically shows one example of this method. In FIG. 22, the numbers shown in each mesh (e.g., <1-2>, <1-7>, etc.) indicate the layers whose layer data is to be obtained. As shown, for the mesh including the searched route 127, the layer data of all layers, i.e., the first to seventh layers, are obtained. In comparison, for the meshes which does not include the searched route 127 but which neighbors on the meshes including the searched route 127, only the data of the first and second layers, i.e., data of the highways and major roads, are obtained.

When the route guide is performed according to the searched route, the user may refer to or consider not only the inter-city highways and the major roads, but also the normal roads and streets around the road on which the vehicle is running. Further, if there are facilities and/or shops along the driving road, those may also be effective guide information. Therefore, for the meshes including the searched route, it is preferable to obtain data of all layers.

On the other hand, the meshes which does not include the searches route but which neighbors on the meshes including the searched route are displayed in the route guide for convenience, but the vehicle does not drive through the area of the mesh. For such neighboring meshes, only the rough data such as data of major roads are enough. Therefore, only the layer data of the first and second layers are obtained for those neighboring meshes, thereby to save the communication cost for obtaining the map data.

The second method is to obtain data of all layers for the meshes within a predetermined range from the destination of the route search, and obtains only the data of the first and the second layers for the other meshes, i.e., roughly obtains data.

The area near the destination designated by the user is the area which the user is most interested in, and for such area, it is preferred that the route guide is performed by using all of the road data of the detailed level of the third and the fourth layers, the auxiliary data in the fifth layer and the logo-marks in the seventh layer, so that the user can quickly and securely arrive at the destination. On the other hand, before reaching the area near the destination, normally the user drives relatively large roads (e.g., highways or arterial roads), and hence the street data in the fourth layer are not necessary so much. Therefore, out of the predetermined range from the destination, the server 101 obtains only the road data of relatively large roads, and omits the road data of small streets and/or auxiliary data, logo-marks if necessary, thereby reducing the layer data to be obtained.

As an modification of this method, the mesh data of all layers may be obtained for the area within a predetermined range around, not only the destination, but also the start point and/or route point (e.g., intersections at which the vehicle change the direction while driving the route). Since the route points are important points in driving along the route, it is preferred to perform route guide with displaying detailed map.

In the third method, if the user designates not to use highways or toll road as the route search condition, the server 101 does not obtain the layer (e.g., the first layer) including such non-used road. By this, the data amount to be transmitted may be reduced.

In the fourth method, the user designates the communication cost required to obtain map data necessary for the searched route at the time of the route search. For example, if the user designated the maximum communication charge necessary to obtain the map data to travel at the time of route search, the server 101 obtains necessary map data within the designated maximum communication charge. Therefore, according to the first or second method described above, the server 101 obtains the mesh data for the area around the start point or destination, and stops obtaining the mesh data when the accumulated communication cost reaches the designated maximum charge.

As described above, since the approximate data amount of layer data of each layer corresponding to one mesh may be statistically guessed, the communication cost required to obtain the layer data corresponding to one mesh may approximately be calculated. Therefore, the server 101 obtains the mesh data according to the first or the second method, and stops obtaining the data when the accumulated communication cost reaches the designated communication cost.

In the fifth method, the user designates necessary layers at the time of route search, and the server 101 obtains only the data of the designated layers. The user may have individual need, for example, a user does not need street data (in the fourth layer) because he does not like driving small roads, and another user does not need logo-marks (in the seventh layer). Therefore, the user designates necessary layer or unnecessary layer at the time of route search, and the server 101 obtains only the data of the necessary layers along the searched route. By this, the communication cost may be reduced because the server 101 does not receive data of unnecessary layers.

In the sixth method, only data of necessary layer is obtained in consideration of the purpose and the like of the travel. The user designates the purpose of the travel, and the server 101 does not obtain data of unnecessary layer. For example, if the purpose of the travel is trip or private drive, the server 101 obtains the background data (in the sixth layer) and the logo-marks (in the seventh layer), but if the purpose of the travel is business transportation, the server 101 does not obtain data of those layers.

In the seventh method, if the searched route includes highway, the server 101 uses the highway mode in the route guide on the highway, and obtains only the data of the layers including highway (i.e., the first and the second layers).

It is noted that the highway mode is selectable by the user when the vehicle with the server 101 is running on a highway (or a predetermined toll road). In the highway mode, map data is not displayed and only the information of the interchanges on the highway the vehicle is running, service areas and parking areas are simply displayed.

Even in using the highway mode, the server 101 needs the information of the road data of the highway and the positional information of the interchanges and service areas. However, when driving on the highway, the road data of normal roads and small streets, shop information along the normal roads and logo-marks are not needed. Therefore, by obtaining only the data of the layers including the road data of highway necessary to perform the highway mode (e.g., the first and the second layers), the communication cost may be reduced.

As described above, according to this example, the mesh data is configured by plural layers, and the data may be obtained by the unit of the layer, and hence the server 101 may obtain only the data of necessary layers to save the communication cost.

(3-4-2) 2ND EXAMPLE

Next, the second example of the map data obtaining process will be described with reference to FIG. 23. In the first example of the third embodiment described above, the server 101 performs route search in response to the route search request by the user, and then the server 101 determines the mesh data and/or layer data to be obtained according to the searched route (step S203 in FIG. 21). On the contrary, in this second example, the server 101 determines the mesh data and/or layer data to be obtained according to the searched route.

Figure 23:
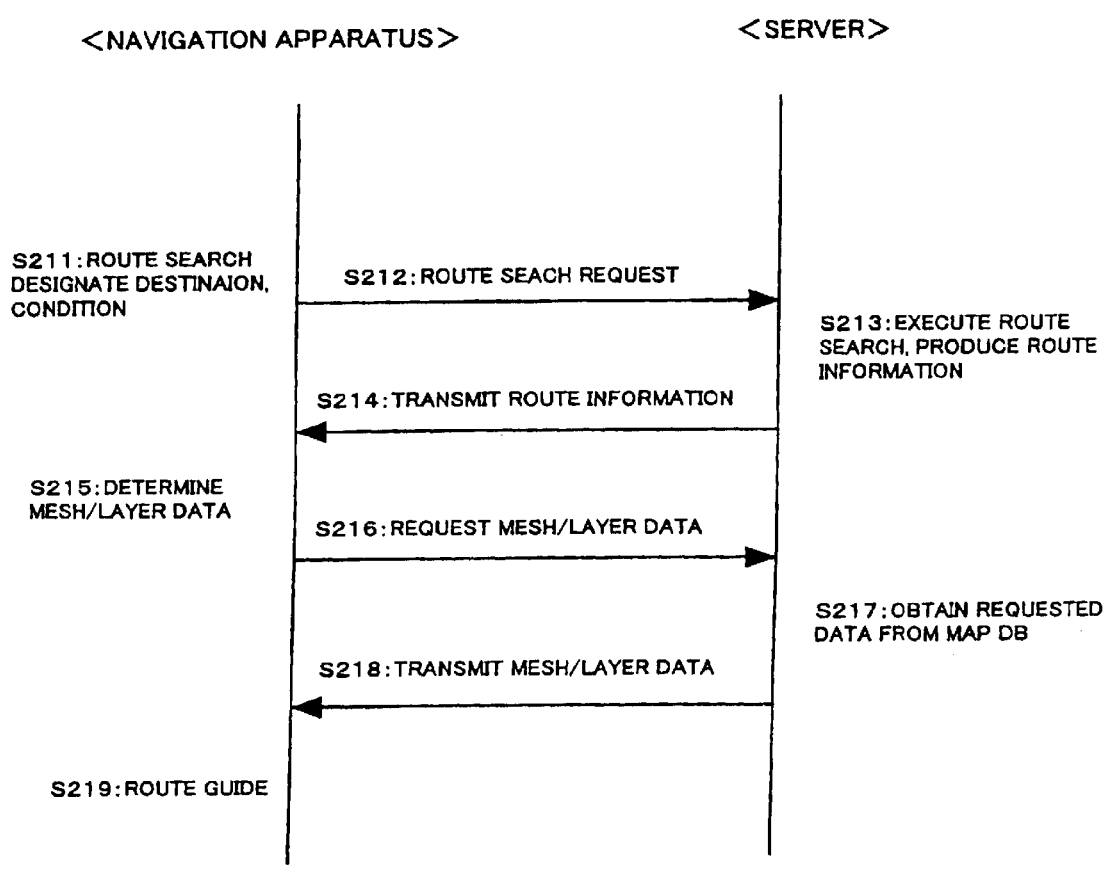
FIG. 23 is a flowchart of map data updating process according to a second example of the third embodiment.

FIG. 23 shows the map data obtaining process according to the second example. In FIG. 23, the user operates the navigation apparatus 7 to call the route search function, designates the start point, the destination and the search condition, if necessary (step S211), and transmits the route search request to the server 101 (step S212).

The server 101 executes route search by using the map data in the map DB 104 based on the information of the start point and the destination included in the route search request to produce the route information (step S213), and transmits it to the navigation apparatus 7 (step S214).

The navigation apparatus 7 receives the route information, and determines the mesh data and/or layer data necessary to the perform the route guide according to the searched route (step S215). Here, the navigation apparatus 7 determines the mesh data and/or layer data to be obtained by using one of, or the combination of, the above-described first to seventh methods, and request the determined data to the server 101 (step S216).

The server 101 obtains the requested mesh data and/or layer data from the map DB 104 (step S217), and transmits it to the navigation apparatus 7 (step S218). The navigation apparatus 7 receives the mesh data and/or layer data, and performs the route guide by using those data and the route information previously received (step S219).

In this way, in the second example, the navigation apparatus 7 determines the mesh data and/or layer data necessary for the vehicle to travel along the searched route and requests those data to the server 101.

It is noted that, the process of steps S216 to S218 may be separately and repeatedly performed during the travel along the guided route, instead of performing it at one time. In that case, the mesh codes of the mesh data and/or layer data determined in step S215 are temporarily stored in the mesh code storage unit 72. The navigation apparatus 7 refers to the mesh code storage unit 72 during the route guide, and requests the mesh data and/or layer data to obtain them from the server 101 when those data becomes necessary.

(3-4-3) 3RD EXAMPLE

In the first and the second examples described above, the mesh data and/or the layer data necessary for the searched route are all obtained from the server 101. However, it is likely that some of those data have already been stored in the data storage unit 36 of the navigation apparatus 7. In that case, the navigation apparatus 7 obtains only the mesh data and/or the layer data that are not in the data storage unit 36. Further, even if the necessary mesh data and/or layer data is in the data storage unit 36, it should be updated if it is old. The third example is directed to the map data obtaining/updating process in such a case.

Figure 24:
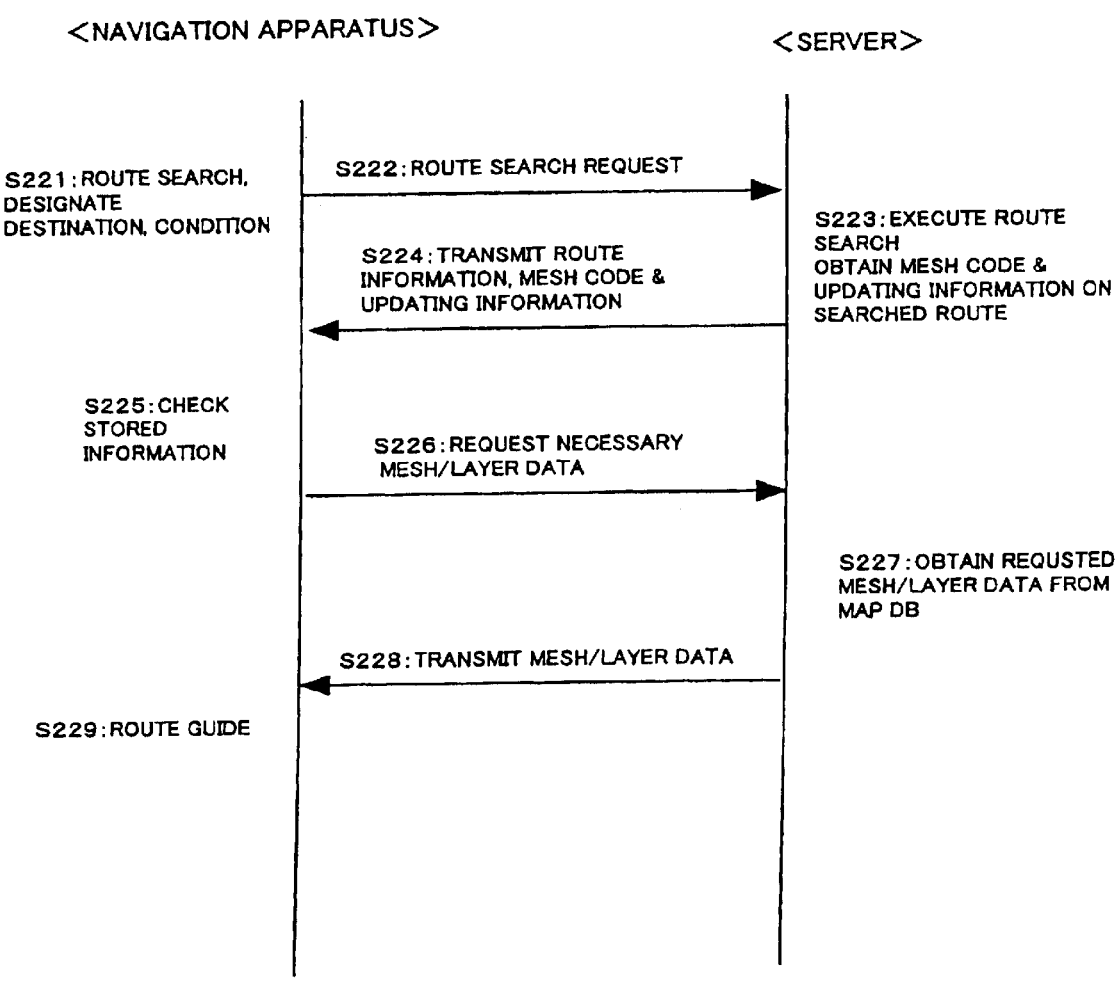
FIG. 24 is a flowchart of map data updating process according to a third example of the third embodiment.

The map data obtaining/updating process according to the third example will be described with reference to FIG. 24. FIG. 24 is a flowchart showing the map data obtaining/updating process according to the third example of the third embodiment.

First, the user of the navigation apparatus 7 operates the input device 60 to call the route search function, designates the start point and the destination (step S221), and performs the route search request (step S222).

The server 101 executes the route search by using the road data in the map DB 104 based on the information of the start point and the destination included in the route search request. Then, the server 101 determines the mesh data and/or the layer data necessary to travel the searched route based on the route information produced by the route search. This process is performed by one or combination of the above-described first to seventh methods. Then, the server 101 obtains the mesh codes and the updating information of the mesh data and/or the layer data thus determined from the map DB 104 (step S223). It is noted that, unlike the first example, the server 101 obtains only the mesh codes and the updating information, and does not obtain the mesh data and/or the layer data itself.

Then, the server 101 transmits the route information thus prepared, as well as the mesh codes and the updating information of the necessary mesh data and/or layer data to the navigation apparatus 7 (step S224).

The navigation apparatus 7 receives the route information, as well as the mesh codes and the updating information of the necessary mesh data and/or layer data, and compares them with the mesh data and the layer data already stored in the pre-install data storage unit 70 and the cache memory unit 71 of the data storage unit 36, thereby to check the stored information (step S225).

Figure 25:
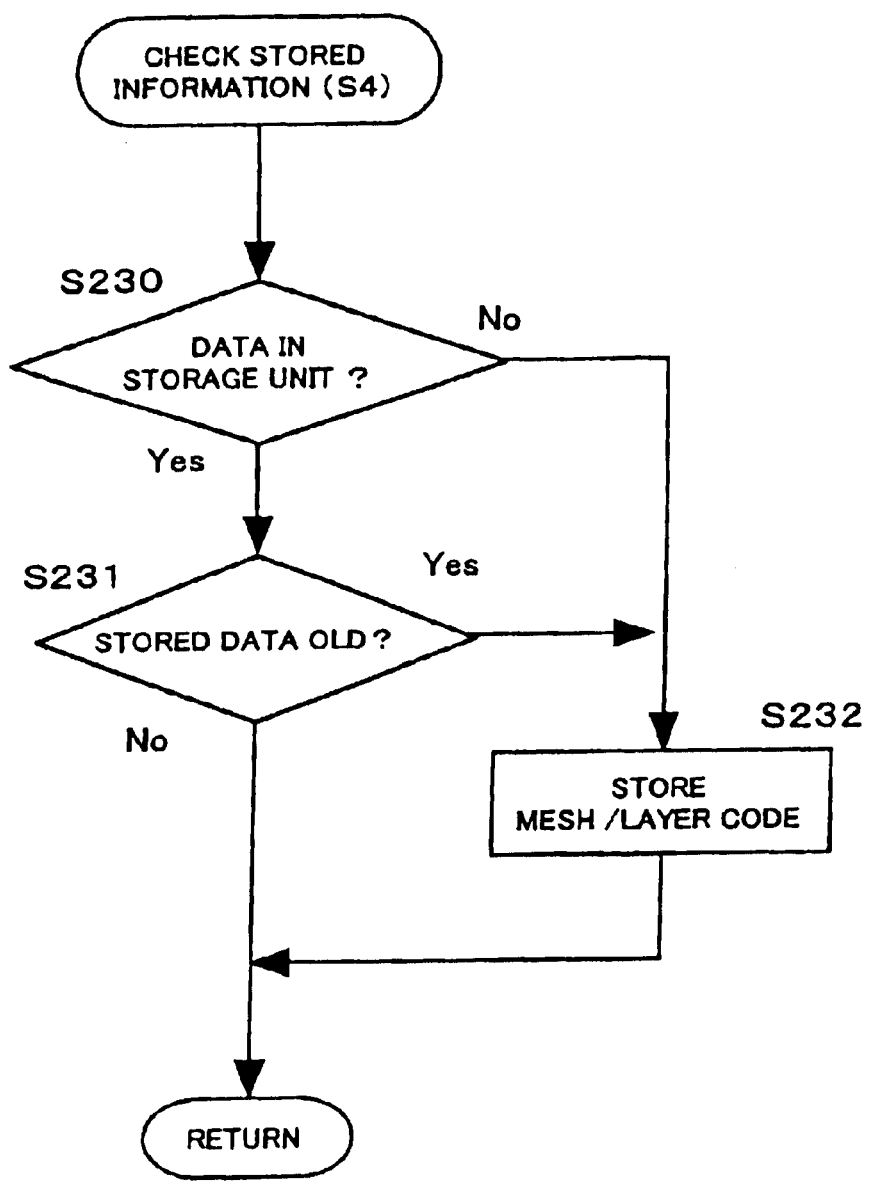
FIG. 25 is a flowchart of stored information check process according to the third embodiment.

The method of checking the stored information is shown in FIG. 25. In FIG. 25, first the navigation apparatus 7 determines whether or not the mesh data and/or layer data corresponding to the received mesh codes are already exist in the data storage unit 36 (step S230). If the received mesh codes include mesh codes that do not exist in the data storage unit 36 (step S230; No), the navigation apparatus 7 stores the mesh codes into the mesh code storage unit 72 (step S232).

Further, if the mesh data and/or layer data corresponding to the received mesh codes are already stored in the data storage unit 36 (step S230; Yes), the navigation apparatus 7 compares the updating information received together with the mesh codes with the updating information of the mesh data or layer data stored in the data storage unit 36 (step S231). If the mesh data or layer data stored in the data storage unit 36 is older, the mesh code is stored in the mesh code storage unit 72 (step S232). If the mesh data or layer data in the data storage unit 36 is newer, the process ends because updating the mesh data is unnecessary. This process is executed for all mesh data or layer data.

When the navigation apparatus 7 completes the check of the stored information in step S225, the mesh codes of the mesh data or layer data needed to be obtained from the service center 6 in order to travel the searched route to the destination are stored in the mesh code storage unit 72. In this case, the mesh codes stored in the mesh code storage unit 72 correspond to the mesh data or layer data that do not exist in the data storage unit 36 and the mesh data or layer data that exist in the data storage unit 36 but are old.

Referring back to FIG. 24, the navigation apparatus 7 designates the mesh codes stored in the mesh code storage unit 72 and transmits the request of the corresponding mesh data to the server 101 (step S226).

The server 101 obtains the requested mesh data from the map DB 104 (step S227), and transmits it to the navigation apparatus 7 (step S228). By this, all of necessary new map data to travel to the destination according to the searched route are prepared in the navigation apparatus 7, and the navigation apparatus 7 starts the route guide along the searched route (step S229). In this way, at the time of performing the route search, only the data necessary for the route guide along the searched route can be efficiently obtained.

It is noted that the process of steps S226 to S228 can be executed separately. Namely, the navigation apparatus 7 may refer to the mesh code storage unit 72 during the travel along the route guide and request the mesh data to the server 101 by separately designating the mesh code when necessary, thereby updating the mesh data one after another.

Modification

The above embodiments are directed to the case where the present invention is applied to the vehicle navigation apparatus. However, the application of the present invention is not limited to this, and the present invention is applicable to various communication-type navigation apparatus for moving body such as ships, airplanes, and also applicable to a portable navigation apparatus that people carry with themselves.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning and range of equivalency of the claims are therefore intended to embraced therein.

The entire disclosure of Japanese Patent Applications No. 2001-263165 filed on Aug. 31, 2001, No. 2001-266021 filed on Sep. 3, 2001, No. 2001-263173 filed on Aug. 31, 2001 and No. 2001-266002 filed on Sep. 3, 2001 including the specification, claims, drawings and summary are incorporated herein by reference in its entirety.

What is claimed is:

1. A server device which can communicate with a communication-type navigation apparatus via a communication path, comprising:
    a search unit which receives a route search request from the communication-type navigation apparatus and executes route search to produce route information of a searched route;
    a determination unit which determines meshes corresponding to road zone, other than a highway zone, of roads on the searched route; and
    a transmission unit which transmits mesh identification information and updating information of the determined meshes, and the route information, to the communication-type navigation apparatus.

2. The server device according to claim 1, wherein the transmission unit comprises a unit which transmits highway mode data corresponding to the highway zone to the communication type navigation apparatus.

3. A communication type navigation apparatus which can communicate with a server device via a communication path, the server device comprises a search unit which receives a route search request from the communication-type navigation apparatus and executes route search to produce route information of a searched route; a determination unit which determines meshes corresponding to road zone, other than a highway zone, of roads on the searched route: and a transmission unit which transmits mesh identification information and updating information of the determined meshes, and the route information, to the communication-type navigation apparatus, the communication-type navigation apparatus comprising:
    a map data storage unit which stores mesh data; and
    a mesh request unit which compares the mesh identification information and the updating information transmitted from the server device with the mesh identification information and the updating information stored in the map data storage unit to determine the mesh data to be obtained from the server device and which requests the determined mesh data to the server device.

4. The communication-type navigation apparatus according to claim 3, further comprising:
    a unit which receives the mesh data, that the mesh request unit has requested, from the server device; and
    a guide unit which performs route guide by using the mesh data and the route information received from the server device.

5. The communication-type navigation apparatus according to claim 4, further comprising a unit which receives highway mode data corresponding to the highway zone from the server device, and wherein the route guide unit performs the route guide by using the highway mode data within the highway zone and performs the route guide by using the mesh data and the route information within zones other than the highway zone.

6. The communication-type navigation apparatus according to claim 4, wherein the map data storage unit stores map data for broad area display, and wherein the route guide unit performs the route guide in a highway mode by using the map data for broad area display and performs the route guide by using the mesh data and the route information within zones other than the highway zone.

7. A server device which can communicate with a communication-type navigation apparatus via a communication path, comprising:
    a search unit which receives a route search request from the communication-type navigation apparatus and executes route search to produce route information of a searched route;
    a mesh determination unit which determines meshes corresponding to predetermined road zone on the searched route: and
    a transmission unit which transmits mesh identification information and updating information of the determined meshes, and the route information, to the communication-type navigation apparatus.

8. The server device according to claim 7, wherein the mesh determination unit determines meshes within a predetermined range from a destination included in the route search request.

9. The server device according to claim 7, wherein the mesh determination unit determines meshes within a zone that a user designates by using the communication-type navigation apparatus.

10. The server device according to claim 7, wherein the mesh determination unit determines meshes including roads other than major roads on the searched route.

11. A communication type navigation apparatus which can communicate with a server device via a communication path, the server device comprises a search unit which receives a route search request from the communication-type navigation apparatus and executes route search to produce route information of a searched route; a mesh determination unit which determines meshes corresponding to predetermined road zone on the searched route: and a transmission unit which transmits mesh identification information and updating information of the determined meshes, and the route information, to the communication-type navigation apparatus, the communication-type navigation apparatus comprising:
    a map data storage unit which stores mesh data; and
    a mesh request unit which compares the mesh identification information and the updating information transmitted from the server device with the mesh identification information and the updating information stored in the map data storage unit to determine the mesh data to be obtained from the server device and which requests the determined mesh data to the server device.

12. The communication-type navigation apparatus according to claim 11, further comprising:
    a unit which receives the mesh data, that the mesh request unit has requested, from the server device; and
    a guide unit which performs route guide by using the mesh data and the route information received from the server device.

13. The communication-type navigation apparatus according to claim 12, further comprising a unit which receives guide information corresponding to zones other than the predetermined zone from the server device, and wherein the route guide unit performs the route guide by presenting the guide information within the zones other than the predetermined zone and performs the route guide by using the mesh data and the route information within the predetermined zone.

14. The communication-type navigation apparatus according to claim 12, wherein the map data storage unit stores the map data for broad area display, and wherein the route guide unit performs route guide by presenting the guide information by using the map data for broad area display within zones other than the predetermined zone and performs the route guide by using the mesh data and the route information within the predetermined area.

15. The communication-type navigation apparatus according to claim 11, wherein the mesh request unit separately requests the mesh data to be obtained to the server device when each mesh data becomes necessary for the route guide.

16. The communication-type navigation apparatus according to claim 11, wherein the mesh request unit requests the mesh data corresponding to the meshes that are not stored in the map data storage unit, out of the meshes necessary to travel along the searched route.

17. The communication-type navigation apparatus according to claim 11, wherein the mesh request unit requests the mesh data corresponding to the meshes having the updating information older than the updating information transmitted from the server device, out of the meshes necessary to travel along the searched route.

18. A server device which can communicate with a communication-type navigation apparatus via a communication path, comprising:
a search unit which receives a route search request from the communication-type navigation apparatus and executes route search to produce route information of a searched route;
a determination unit which determines meshes necessary to travel along the searched route; and
a transmission unit which transmits mesh identification information and updating information of the determined meshes, and the route information, to the communication-type navigation apparatus.

19. The server device according to claim 18, further comprising a unit which receives a mesh data request of some meshes, out of the meshes necessary to travel along the searched route, from the communication-type navigation apparatus, and which transmits newest mesh data for the requested meshes to the communication-type navigation apparatus.

20. A communication type navigation apparatus which can communicate with a server device via a communication path, the server device comprising a search unit which receives a route search request from the communication-type navigation apparatus and executes route search to produce route information of a searched route; a determination unit which determines meshes necessary to travel along the searched route; and a transmission unit which transmits mesh identification and updating information of the determined meshes, and the route information, to the communication-type navigation apparatus, the communication-type navigation apparatus comprising:
a map data storage unit which stores a plurality of mesh data; and
a mesh request unit which compares the mesh identification information and the updating information of the meshes necessary to travel along the searched route with the mesh identification information and the updating information stored in the map data storage unit to determine the mesh data to be obtained from the server device, and which requests the determined mesh data to the server device.

21. The communication-type navigation apparatus according to claim 20, wherein the mesh request unit requests the mesh data corresponding to the meshes that are not stored in the map data storage unit, out of the meshes necessary to travel along the searched route.

22. The communication-type navigation apparatus according to claim 20, wherein the mesh request unit requests the mesh data having the updating information older than the updating information transmitted from the server device, out of the meshes necessary to travel along the searched route.

23. The communication-type navigation apparatus according to claim 20, wherein the mesh request unit requests all of the mesh data to be obtained from the server device all at once.

24. The communication-type navigation apparatus according to claim 20, further comprising:
a unit which receives the mesh data, that the mesh request unit has requested, from the server device; and
a unit which performs route guide based on the route information.

25. The communication-type navigation apparatus according to claim 20, wherein the mesh request unit separately requests the mesh data to be obtained to the server device when each mesh data becomes necessary for the route guide.

26. The communication-type navigation apparatus according to claim 20, wherein the map data storage unit comprises:
a pre-install data storage unit which stores pre-install data; and
a cache memory unit which stores mesh data obtained during travel.

27. A server device which can communicate with a communication-type navigation apparatus, comprising:
a map database which stores a plurality of mesh data;
a search unit which receives a route search request from the communication-type navigation apparatus, which executes route search to produce route information of a searched route and which transmits the route information to the communication-type navigation apparatus; and
an updating data transmission unit which receives the mesh identification information and updating information of the mesh data, that is necessary to travel along the searched route and that is stored in the communication-type navigation apparatus, which obtains mesh data, having the updating information newer than that of the mesh data stored in the communication-type navigation apparatus, from the map database, and which transmits the obtained mesh data to the communication-type navigation apparatus.

28. A communication-type navigation apparatus which can communicate with a server device via a communication path, the server device comprising a map database which stores a plurality of mesh data; a search unit which receives a route search request from the communication-type navigation apparatus, which executes route search to produce route information of a searched route and which transmits the route information to the communication-type navigation apparatus; and an updating data transmission unit which receives the mesh identification information and updating information of the mesh data, that is necessary to travel along the searched route and that is stored in the communication-type navigation apparatus, which obtains mesh data, having the updating information newer than that of the mesh data stored in the communication-type navigation apparatus, from the map database, and which transmits the obtained mesh data to the communication-type navigation apparatus, the navigation apparatus comprising:

a map data storage unit which stores a plurality of mesh data; and an updating information transmission unit which receives the route information, which determines the mesh data necessary to travel along the searched route, and which transmits the mesh identification information and the updating information of the mesh data stored in the map data storage unit, out of the mesh data necessary to travel along the searched route, to the server device.

29. The communication-type navigation apparatus according to claim 28, wherein the updating information transmission unit transmits all of the mesh identification information and the updating information all at once.

30. The communication-type navigation apparatus according to claim 28, further comprising a unit which performs route guide based on the route information.

31. The communication-type navigation apparatus according to claim 28, wherein the updating information transmission unit separately transmits the mesh identification information and the updating information of the mesh data, that is necessary to travel along the searched route and that is stored in the map data storage unit, to the server device when each of the mesh identification information and the updating information become necessary during the route guide.

32. The communication-type navigation apparatus according to claim 28, wherein the map data storage unit comprises:

a pre-install data storage unit which stores pre-install data; and a cache memory unit which stores mesh data obtained during travel.

33. A server device which can communicate with a communication-type navigation apparatus via a communication path, comprising:

a search unit which receives a route search request from the communication-type navigation apparatus and executes route search to produce route information of a searched route;

a mesh determination unit which determines meshes necessary to travel along the searched route;

a unit which determines whether or not the processing burden of the server device is higher than a predetermined burden level at the time when the server device receives the route search request; and a transmission unit which transmits the route information to the communication-type navigation unit when the processing burden of the server device is higher than the predetermined processing burden level, and transmits the mesh identification information and the updating information as well as the route information to the communication-type navigation apparatus when the processing burden of the server device is not higher than the predetermined burden level.

34. A server device which can communicate with a communication-type navigation apparatus via a communication path, comprising:

a search unit which receives a route search request from the communication-type navigation apparatus and executes route search to produce route information of a searched route;

a determination unit which determines blocks including meshes necessary to travel along the searched route; and a transmission unit which transmits block identification information and updating information of the determined meshes, and the route information, to the communication-type navigation apparatus.

35. The server device according to claim 34, further comprising a unit which receives a mesh data request of meshes included in the blocks from the communication-type navigation apparatus, and which transmits newest mesh data for the requested meshes to the communication-type navigation apparatus.

36. A communication type navigation apparatus which can communicate with a server device via a communication path, the server device comprising a search unit which receives a route search request from the communication-type navigation apparatus and executes route search to produce route information of a searched route; a determination unit which determines blocks including meshes necessary to travel along the searched route; and a transmission unit which transmits block identification information and updating information of the determined meshes, and the route information, to the communication-type navigation apparatus, the communication-type navigation apparatus comprising:

a map data storage unit which stores a plurality of mesh data; and a mesh request unit which compares the mesh identification information and the updating information of the meshes included in the block whose block identification is received with the mesh identification information and the updating information stored in the map data storage unit to determine the mesh data to be obtained from the server device, and which requests the determined mesh data to the server device.

37. The communication-type navigation apparatus according to claim 36, wherein the mesh request unit requests the mesh data corresponding to the meshes that are not stored in the map data storage unit, out of the meshes included in the blocks.

38. The communication-type navigation apparatus according to claim 36, wherein the mesh request unit requests the mesh data having the updating information older than the updating information transmitted from the server device, out of the meshes included in the blocks.

39. The communication-type navigation apparatus according to claim 36, wherein the mesh request unit requests all of the mesh data to be obtained from the server device all at once.

40. The communication-type navigation apparatus according to claim 36, further comprising:

a unit which receives the mesh data, that the mesh request unit has requested, from the server device; and a unit which performs route guide based on the route information.

41. The communication-type navigation apparatus according to claim 36, wherein the mesh request unit separately requests the mesh data to be obtained to the server device when each mesh data becomes necessary for the route guide.

42. The communication-type navigation apparatus according to claim 36, wherein the map data storage unit comprises:
- a pre-install data storage unit which stores pre-install data; and
- a cache memory unit which stores mesh data obtained during travel.

43. A server device which can communicate with a communication-type navigation apparatus, comprising:
- a map database which stores a plurality of mesh data;
- a search unit which receives a route search request from the communication-type navigation apparatus, which executes route search to produce route information of a searched route and which transmits the route information to the communication-type navigation apparatus; and
- an updating data transmission unit which receives the mesh identification information and updating information of the mesh data of blocks including meshes necessary to travel along the searched route, which obtains mesh data of the blocks, having the updating information newer than that of the blocks received, from the map database, and which transmits the obtained mesh data to the communication-type navigation apparatus.

44. A communication-type navigation apparatus which can communicate with a server device via a communication path, the server device comprising a map database which stores a plurality of mesh data; a search unit which receives a route search request from the communication-type navigation apparatus, which executes route search to produce route information of a searched route and which transmits the route information to the communication-type navigation apparatus; and an updating data transmission unit which receives the mesh identification information and updating information of the mesh data of blocks including meshes necessary to travel along the searched route, which obtains mesh data of the blocks, having the updating information newer than that of the blocks received, from the map database, and which transmits the obtained mesh data to the communication-type navigation apparatus, the navigation apparatus comprising:
- a map data storage unit which stores a plurality of mesh data; and
- an updating information transmission unit which receives the route information, which determines the blocks including the meshes necessary to travel along the searched route, and which transmits the block identification information and the updating information to the server device.

45. The communication-type navigation apparatus according to claim 44, wherein the updating information transmission unit transmits all of the block identification information and the updating information all at once.

46. The communication-type navigation apparatus according to claim 44, further comprising a unit which performs route guide based on the route information.

47. The communication-type navigation apparatus according to claim 44, wherein the updating information transmission unit separately transmits the block identification information and the updating information of the mesh data, that is necessary to travel along the searched route and that is stored in the map data storage unit, to the server device when each of the mesh identification information and the updating information become necessary during the route guide.

48. The communication-type navigation apparatus according to claim 44, wherein the map data storage unit comprises:
- a pre-install data storage unit which stores pre-install data; and
- a cache memory unit which stores mesh data obtained during travel.

49. A server device which can communicate with a communication-type navigation apparatus, comprising:
- a search unit which receives a route search request from the communication-type navigation apparatus and executes route search to produce route information of a searched route;
- a layer selection unit which selects layer of the mesh data necessary to travel along the searched route based on the route information; and
- a transmission unit which transmits layer data of the selected layer and the route information to the communication-type navigation apparatus.

50. A server device which can communicate with a communication-type navigation apparatus, comprising:
- a search unit which receives a route search request from the communication-type navigation apparatus and executes route search to produce route information of a searched route;
- a layer selection unit which selects layer of the mesh data necessary to travel along the searched route based on the route information; and
- a transmission unit which transmits identification information and updating information of layer data of the selected layer and the route information to the communication-type navigation apparatus.

51. The server device according to claim 50, wherein the layer selection unit selects the layer data of all layers for the meshes that include the searched route and selects the layer data of a portion of the layers for the meshes that do not include the searched route.

52. The server device according to claim 50, wherein the layer selection unit selects the layer data of all layers for the meshes within a predetermined range from a destination and selects the layer data of a portion of the layers for the meshes outside of the predetermined range.

53. The server device according to claim 50, wherein the layer selection unit does not select layers including only highway or toll road if the route search request includes such a condition that highway or toll road is not used.

54. The server device according to claim 50, wherein the layer selection unit selects only specific layers predetermined according to a purpose of route search if the route search request includes a designation of the purpose of the route search.

55. The server device according to claim 50, wherein, if the route search request includes such a condition that specific layer is not used, the layer selection unit does not select the specific layer.

56. The server device according to claim 50, wherein, if the searched route includes highway zone, the layer selection unit selects the layer including only road data of the highway for the meshes corresponding to the highway zone.

57. The server device according to claim 50, wherein, if the route search request includes a maximum communication charge necessary for obtaining map data, the layer selection unit selects the layers within the maximum communication charge.

58. A communication-type navigation apparatus which can communicate with a server device via a communication path, the server device comprising a transmission unit which receives route search request from the communication-type navigation apparatus, executes route search to produce route information of a searched route and transmits the route information to the navigation apparatus, the navigation apparatus comprising:

a layer selection unit which selects layers of mesh data necessary to travel along the searched route based on the route information transmitted from the server device; and a request unit which requests the layer data of the selected layers to the server device.

59. The communication-type navigation apparatus according to claim 58, wherein the layer selection unit selects the layer data of all layers for the meshes that include the searched route and selects the layer data of a portion of the layers for the meshes that do not include the searched route.

60. The communication-type navigation apparatus according to claim 58, wherein the layer selection unit selects the layer data of all layers for the meshes within a predetermined range from a destination and selects the layer data of a portion of the layers for the meshes outside of the predetermined range.

61. The communication-type navigation apparatus according to claim 58, wherein the layer selection unit does not select layers including only highway or toll road if the route search request includes such a condition that highway or toll road is not used.

62. The communication-type navigation apparatus according to claim 58, wherein the layer selection unit selects only specific layers predetermined according to a purpose of route search if the route search request includes a designation of the purpose of the route search.

63. The communication-type navigation apparatus according to claim 58, wherein, if the route search request includes such a condition that specific layer is not used, the layer selection unit does not select the specific layer.

64. The communication-type navigation apparatus according to claim 58, wherein, if the searched route includes highway zone, the layer selection unit selects the layer including only road data of the highway for the meshes corresponding to the highway zone.

65. The communication-type navigation apparatus according to claim 58, wherein, if the route search request includes a maximum communication charge necessary for obtaining map data, the layer selection unit selects the layers within the maximum communication charge.

* * * * *